US012498052B2

(12) United States Patent
Pemberton et al.

(10) Patent No.: US 12,498,052 B2
(45) Date of Patent: Dec. 16, 2025

(54) AREA VALVE SERVICE UNIT

(71) Applicant: GCE Group AB, Malmo (SE)

(72) Inventors: Gareth Pemberton, Worcester (GB); Mark Webster, Norfolk (GB); Antoon DeBruijn, Norfolk (GB); Dhineshkumar Soundararajan, Nagar (IN); Subramani Alagarsamy, Madiwala (IN)

(73) Assignee: GCE GROUP AB, Malmö (SE)

( * ) Notice: Subject to any disclaimer, the term of this patent is extended or adjusted under 35 U.S.C. 154(b) by 8 days.

(21) Appl. No.: 18/732,775

(22) Filed: Jun. 4, 2024

(65) Prior Publication Data
US 2024/0392887 A1 Nov. 28, 2024

Related U.S. Application Data

(63) Continuation of application No. PCT/IB2022/061840, filed on Dec. 6, 2022.

(30) Foreign Application Priority Data

Dec. 8, 2021 (IN) .............................. 202141057018

(51) Int. Cl.
*F16K 27/12* (2006.01)
*F16K 35/04* (2006.01)

(52) U.S. Cl.
CPC .............. *F16K 27/12* (2013.01); *F16K 35/04* (2013.01)

(58) Field of Classification Search
CPC .............. F16K 27/12; Y10T 137/7043; Y10T 137/7062; F17C 13/04; F17C 220/0107; F17C 2205/0111; F17C 2205/0329
See application file for complete search history.

(56) References Cited

U.S. PATENT DOCUMENTS

| 4,625,627 | A | * | 12/1986 | Livanos | ................ F17C 13/084 |
| | | | | | 454/49 |
| 5,440,477 | A | | 8/1995 | Rohrberg et al. | |
| 5,964,246 | A | * | 10/1999 | Meeker | ................... E03C 1/042 |
| | | | | | 137/382 |
| 6,041,812 | A | * | 3/2000 | Hilbers | ................... F23K 5/007 |
| | | | | | 137/382 |

(Continued)

FOREIGN PATENT DOCUMENTS

KR 200380188 Y1 3/2005

OTHER PUBLICATIONS

Notification of Transmittal of International Search Report and Written Opinion including International Search Report and Written Opinion for International Patent Application No. PCT/IB2022/061840 mailed Mar. 15, 2023, 14 pages.

(Continued)

*Primary Examiner* — Kevin F Murphy
(74) *Attorney, Agent, or Firm* — Edell, Shapiro & Finnan, LLC

(57) ABSTRACT

A gas and vacuum system is disclosed, and, in particular, an area valve service unit configured to provide local isolation of individual parts of a gas and vacuum system that may be required for installation, maintenance, or in the event of an emergency. The area valve service unit can have one or more shutoff valves, each of which has an associated access panel with a movable access panel door.

20 Claims, 37 Drawing Sheets

(56) References Cited

U.S. PATENT DOCUMENTS

| | | | | |
|---|---|---|---|---|
| 6,079,439 | A * | 6/2000 | Hartley | F16L 59/161 |
| | | | | 138/149 |
| 6,173,733 | B1 * | 1/2001 | Pruitt | E03B 7/077 |
| | | | | 52/21 |
| 7,237,568 | B2 * | 7/2007 | Cooper | A62C 37/50 |
| | | | | 137/382 |
| 9,383,064 | B2 * | 7/2016 | Olander | F24F 11/74 |
| 9,759,384 | B2 * | 9/2017 | Frenal | F17C 13/084 |
| 2016/0305682 | A1 | 10/2016 | Olander et al. | |

OTHER PUBLICATIONS

AVSU Millennium Medical Products Limited, Medial Gas Valves, https://mmpl.uk.com/products/medical-gas-valves/avsu/, 3 pages.
AVSU Module—Precision UK Ltd, https://www.precisionuk.co.uk/product/avsu-module/, 4 pages.
Zeus AVSU Module Technical Data Sheet, Pneumatech Medical Gas Solutions, 3 pages.
Beaconmedaes, Medizone Area Valve Service Module Specification, 7 pages.

\* cited by examiner

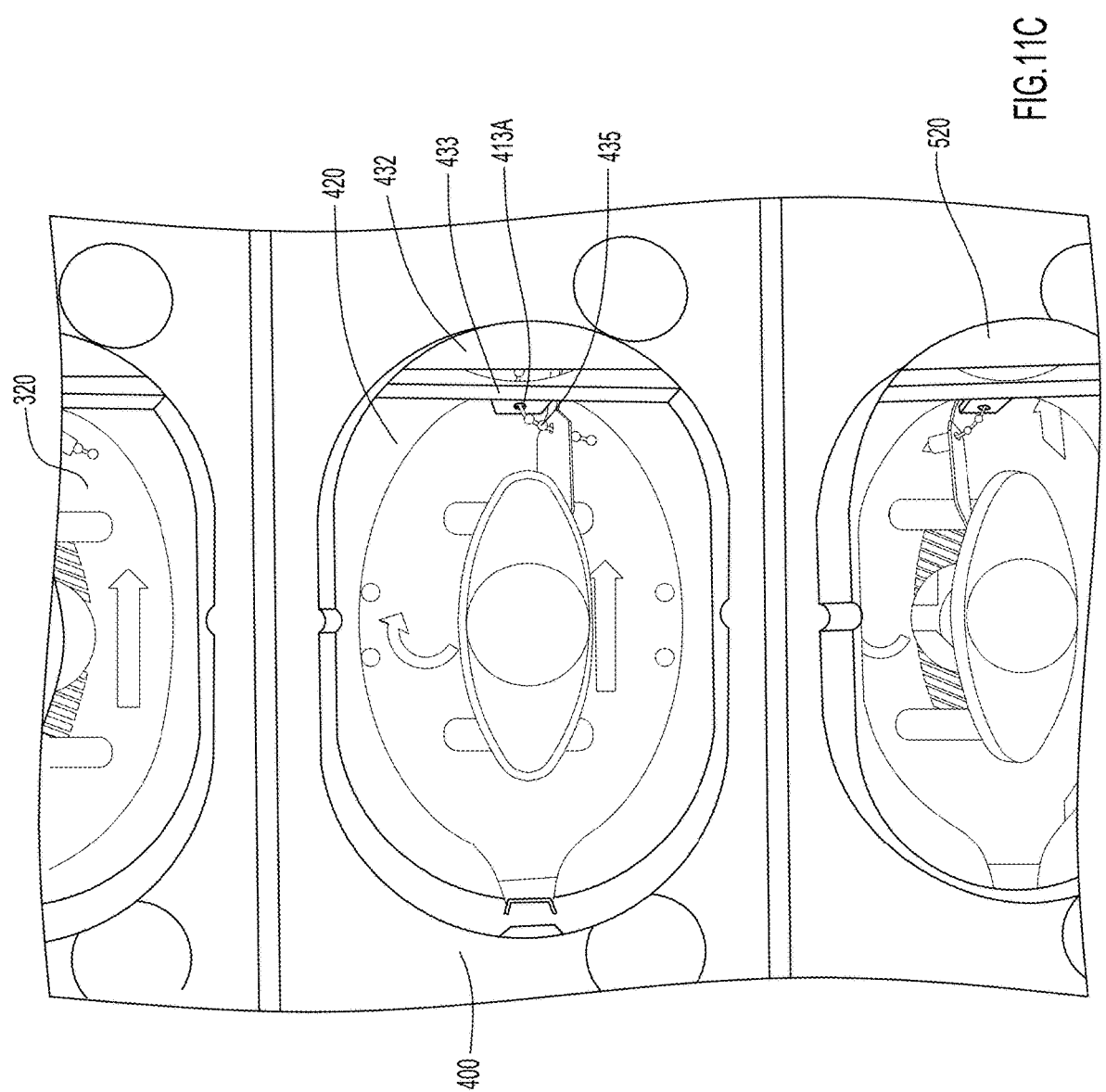

AREA VALVE SERVICE UNIT

CROSS-REFERENCE TO RELATED APPLICATIONS

This patent application is a continuation application of and claims priority under 35 U.S.C 120 to International Application No. PCT/IB2022/061840, filed Dec. 6, 2022, entitled "Area Valve Service Unit", which in turn claims priority to and the benefit of Indian Patent Application No. 202141057018, filed Dec. 8, 2021, entitled "Area Valve Service Unit". The entire disclosure of each of the above-identified two patent applications is incorporated herein by reference.

TECHNICAL FIELD

The present disclosure is directed toward a gas and vacuum system, and, in particular, an area valve service unit configured to provide local isolation of individual parts of a gas and vacuum system that may be required for installation, maintenance, or in the event of an emergency.

BACKGROUND OF THE INVENTION

An area valve service unit (hereinafter an "AVSU") is a unit that includes a valve that can be manipulated by a user to shutoff a flow of fluid to one or more components of a system. There is a need for an AVSU that enables an operator to easily and locally isolate individual portions or subsystems of a gas and vacuum system (e.g., for a medical application), which may be required for installation of the various subsystems of the gas and vacuum system, maintenance of the medical gas and vacuum system and/or the AVSU itself. There is a need for an AVSU that allows an operator to utilize the AVSU in the event of an emergency (e.g., to quickly shut off gas flow to a particular subsystem of the gas and vacuum system).

SUMMARY OF THE INVENTION

The present invention relates to an area service valve unit for a gas and vacuum system. In one embodiment, the area service valve unit includes a cabinet defining an interior volume, the cabinet including a first access panel coupled to the cabinet, the first access panel being movable between an opened position and a closed position relative to the cabinet, the first access panel having an opening formed therein. The area service valve unit also includes a first shutoff valve being in fluid communication with the gas and vacuum system, the first shutoff valve being located in the interior volume and behind the first access panel, the first shutoff valve having a first handwheel that can be manipulated to open and close the first shutoff valve, the first handwheel being aligned with the opening of the first access panel. In addition, the area service valve unit also includes a first access panel door mounted to the first access panel and covering the opening formed in the first access panel, the first access panel door being movable between a closed position and an opened position. Also, the area service valve unit also includes a first cover plate located between the first handwheel and the first shutoff valve, wherein the first cover plate is bendable to facilitate a user to access a component behind the first cover plate without removing the first handwheel or the first cover plate after the first access panel door is opened.

In one embodiment, the first cover plate is made of a flexible material that enables bending of the first cover plate while the first cover plate remains mounted between the first handwheel and the first shutoff valve. In another embodiment, the first access panel door has an auxiliary opening formed therethrough, the auxiliary opening is aligned with an auxiliary connection of the gas and vacuum system, and the auxiliary connection is located behind the first access panel door. Alternatively, an auxiliary plate is mountable to the first access panel door, the auxiliary plate covering the auxiliary opening when the auxiliary plate is mounted to the first access panel door.

In another embodiment, the first access panel includes a first aperture, the first access panel door includes a second aperture, and the first access panel door is secured in its closed position by a first securement member that engages the first aperture and the second aperture. In addition, the first securement member is a tether that can be broken when a user pulls with sufficient force on the first access panel door relative to the first access panel. The first access panel door can be opened by breaking the tether and can be subsequently removed from the first access panel, and the first access panel door can be secured to the first access panel with a second securement member. The second securement member can be engaged with the first aperture and the second aperture when the first access panel door is remounted to the first access panel.

In yet another embodiment, the area service valve unit includes a first pipe in fluid communication with the first shutoff valve, the first pipe carrying a flow of fluid to the first shutoff valve, and a second pipe in fluid communication with the first shutoff valve, the second pipe carrying a flow of fluid away from the first shutoff valve, wherein each of the first pipe and the second pipe extends from the interior volume of the cabinet to the outside of the cabinet. Also, the cabinet includes a second access panel movably coupled to the cabinet, and the area service valve unit further includes a second shutoff valve being located behind the second access panel, a second access panel door movably mounted to the second access panel, a third pipe in fluid communication with the second shutoff valve, the third pipe carrying a flow of fluid to the second shutoff valve, and a fourth pipe in fluid communication with the second shutoff valve, the fourth pipe carrying a flow of fluid away from the second shutoff valve, wherein each of the third pipe and the fourth pipe extends from the interior volume of the cabinet to the outside of the cabinet. The first access panel door is movable relative to the cabinet independent of any movement of the second access panel door, and the first access panel is movable relative to the cabinet independent of any movement of the second access panel.

In an alternative embodiment, the cabinet includes six access panels coupled thereto and the first access panel is one of the six access panels, and the area service valve unit includes six shutoff valves in fluid communication with the gas and vacuum system with the first shutoff valve being one of the six shutoff valves, six access panel doors coupled to the cabinet with the first access panel door being one of the six access panel doors, six inlet pipes being coupled to the six shutoff valves, each of the six inlet pipes carrying a flow of fluid to one of the six shutoff valves, wherein three of the inlet pipes overlap with the other three of the inlet pipes in the interior volume of the cabinet, and six outlet pipes being coupled to the six shutoff valves, each of the six outlet pipes carrying a flow of fluid away from one of the six shutoff valves, wherein three of the outlet pipes overlap the other three of outlet pipes in the interior volume of the cabinet.

In addition, the six inlet pipes include a first inlet pipe, a second inlet pipe, a third inlet pipe, a fourth inlet pipe, a fifth inlet pipe, and a sixth inlet pipe, and the fourth inlet pipe overlaps the first inlet pipe, the fifth inlet pipe overlaps the second inlet pipe, and the six inlet pipe overlaps the third inlet pipe, and the area service valve unit includes a clamping mechanism coupled to the cabinet, the clamping mechanism securing the first inlet pipe, the second inlet pipe, the third inlet pipe, the fourth inlet pipe, the fifth inlet pipe, and the sixth inlet pipe in an overlapping arrangement. Also, the clamping mechanism includes an inner bracket portion coupled to the cabinet, at least one intermediate bracket portion located between pairs of the six inlet pipes, and an outer bracket portion coupled to the at least one intermediate bracket portion and to the inner bracket portion by at least one fastener.

In an alternative embodiment of the invention, the area service valve unit for a gas and vacuum system includes a cabinet defining an interior volume, the cabinet including a plurality of access panels independently coupled to the cabinet, each of the plurality of access panels being movable between an opened position and a closed position relative to the cabinet, each of the plurality of the access panels having an opening formed therein, a plurality of shutoff valves being in fluid communication with the gas and vacuum system, each of the plurality of shutoff valves being located in the interior volume of the cabinet and behind a respective one of the plurality of access panels, each of the plurality of shutoff valves having a handwheel that can be manipulated to open and close the particular shutoff valve, a plurality of access panel doors, each of the plurality of access panel doors being mounted to one of the plurality of access panels and covering the respective opening in the particular access panel, each of the plurality of access panel doors being independently movable between a closed position and an opened position, each of the plurality of access panel doors being removable from its associated access panel and reattachable to its associated access panel via a securement member, and a plurality of cover plates, each of the plurality of cover plates being located between one of the plurality of shutoff valves and its associated handwheel, wherein each of the cover plates is flexible and can be bent to facilitate user access to a component behind the particular cover plate without removing the respective handwheel or cover plate.

In one embodiment, the area service valve unit includes a plurality of inlet pipes extending from outside the cabinet to the interior volume of the cabinet, each of the plurality of inlet pipes being fluidically coupled to one of the plurality of shutoff valves, and a plurality of outlet pipes extending from the interior volume of the cabinet to outside the cabinet, each of the plurality of outlet pipes being fluidically coupled to one of the plurality of shutoff valves, wherein at least one of the plurality of inlet pipes overlaps with another one of the plurality of inlet pipes in the interior volume of the cabinet, and at least one of the plurality of outlet pipes overlaps with another one of the plurality of outlet pipes in the interior volume of the cabinet.

In another embodiment, the area service valve unit includes a first clamping mechanism coupled to the cabinet, the first clamping mechanism securing overlapping inlet pipes in an overlapping configuration, and a second clamping mechanism coupled to the cabinet, the second clamping mechanism securing overlapping outlet pipes in an overlapping configuration.

In yet another embodiment of the present invention, the area service valve unit for a gas and vacuum system includes a cabinet defining an interior volume, the cabinet including a plurality of access panels independently coupled to the cabinet, each of the plurality of access panels being movable between an opened position and a closed position relative to the cabinet, each of the plurality of the access panels having an opening formed therein, a plurality of shutoff valves being in fluid communication with the gas and vacuum system, each of the plurality of shutoff valves being located in the interior volume of the cabinet and behind a respective one of the plurality of access panels, each of the plurality of shutoff valves having a handwheel that can be manipulated to open and close the particular shutoff valve, and a plurality of access panel doors, each of the plurality of access panel doors being coupled to one of the plurality of access panels and covering the respective opening in the particular access panel, secured to its associated access panel by a first securement member, rotatable relative to its associated access panel between a closed position and an opened position after a sufficient force is applied to the access panel door to break the first securement member, removable from its associated access panel, and reattachable to its associated access panel and secured thereto via a second securement member.

In one embodiment, each of the access panels includes a slot proximate to its opening, and each of the plurality of access panel doors includes an extending member that can be engaged with the slot of the respective access panel to which the particular access panel door is coupled.

In another embodiment, each of the access panel doors includes a first end proximate to which its extending member is located and an opposite second end to which its first securement member is coupled.

BRIEF DESCRIPTION OF THE DRAWINGS

The apparatuses, systems, devices, modules, and/or components presented herein may be better understood with reference to the following drawings and description. It should be understood that some elements in the figures may not necessarily be to scale and that emphasis has been placed upon illustrating the principles disclosed herein.

FIG. 11C illustrates a front view of an access panel with an access panel door being equipped with a securement tab.

DETAILED DESCRIPTION

In the following detailed description, reference is made to the accompanying figures which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the description herein. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

Figure 1:
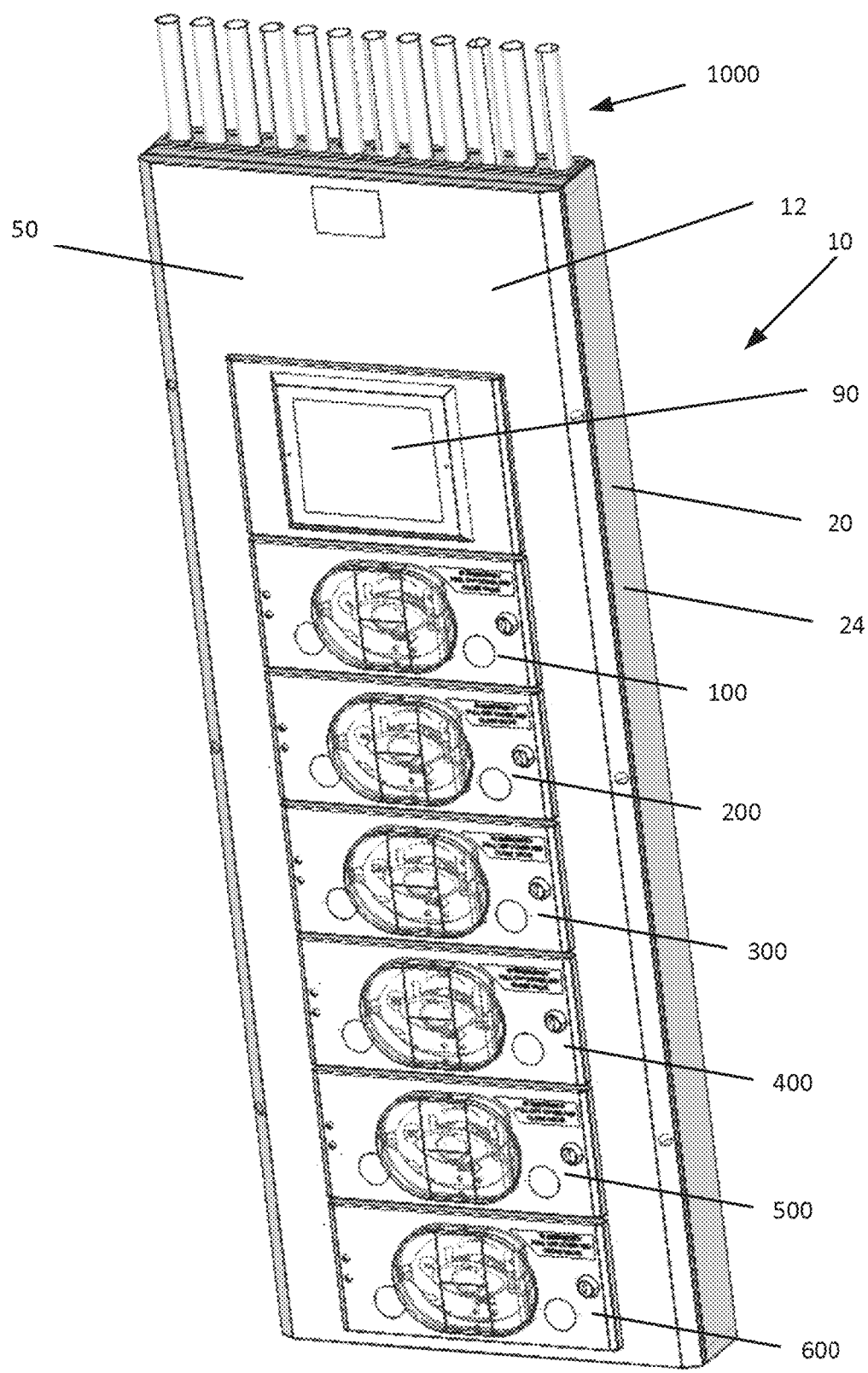
FIG. 1 illustrates a front perspective view of an embodiment of an AVSU.

Illustrated in FIG. 1 is a front perspective view of an area valve service unit or AVSU 10. The AVSU 10 is configured to enable an operator to locally isolate individual portions or subsystems of a gas and vacuum system (e.g., for a medical application), which may be required for installation of the various subsystems of the gas and vacuum system, maintenance of the medical gas and vacuum system and/or the AVSU itself. An operator may also utilize the AVSU in the event of an emergency (e.g., to quickly shut off gas flow to a particular subsystem of the gas and vacuum system). As illustrated, the AVSU 10 may be in the form of a cabinet 20 with a control panel 90 and a plurality of access panels 100, 200, 300, 400, 500, and 600 disposed on the front 12 of the AVSU 10. Each of the access panels 100, 200, 300, 400, 500, and 600 is associated with a valve and other system components, as described in detail below. Also, each of the access panels, the access panel doors, the cover plates, the handwheels, and the shutoff valves that are described in greater detail below are independently movable and operable relative to each other.

Figure 2:
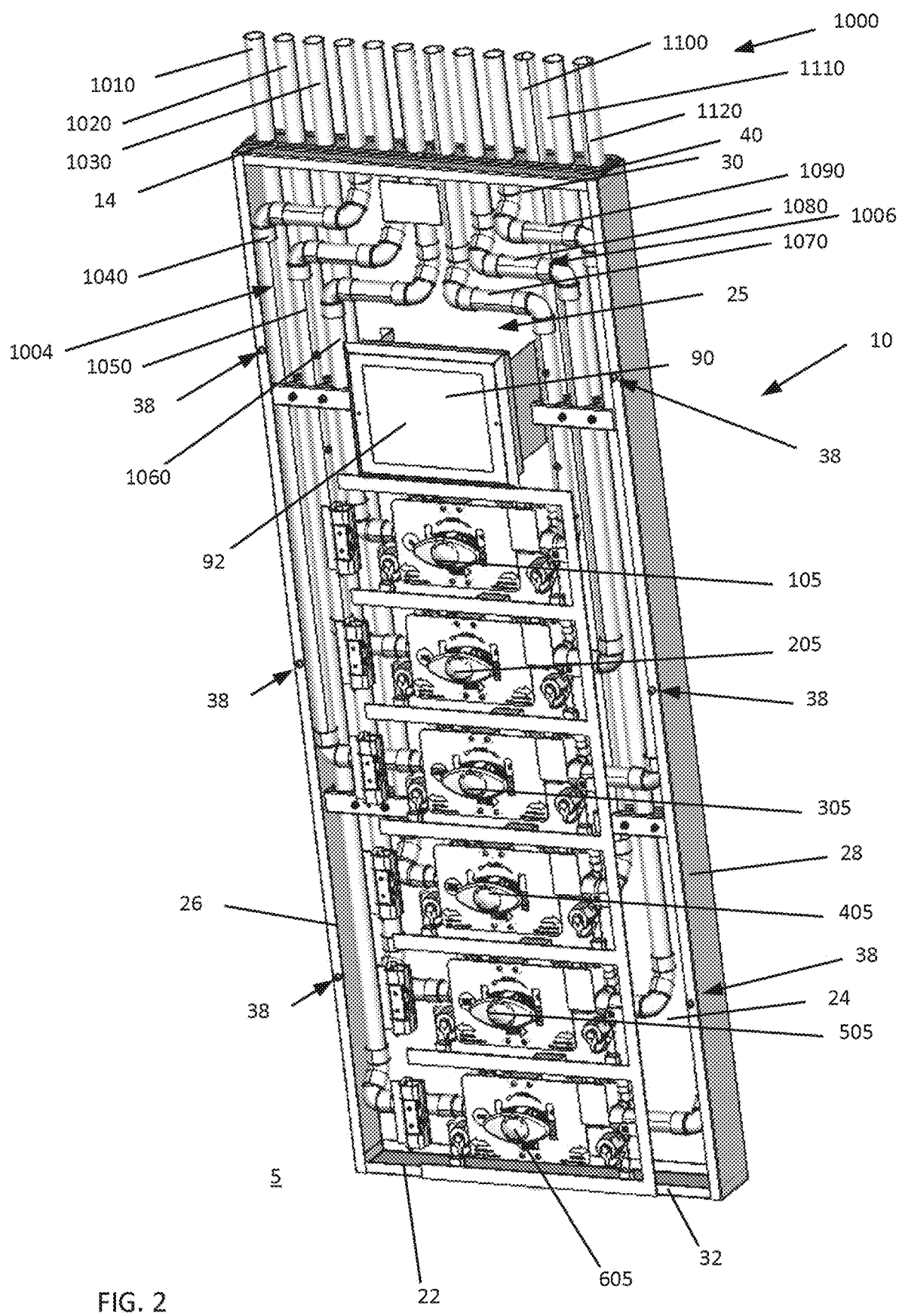
FIG. 2 illustrates a front perspective view of the AVSU illustrated in FIG. 1 with the front frame member and access panels removed to show the internal components of the AVSU.

As best illustrated in FIG. 2, the cabinet 20 of the AVSU 10 may include a bottom end frame member 22, which is configured to be disposed on a support surface 5, and a back or rear frame member 24 coupled to, and extending upwardly or vertically from, the bottom end frame member 22. The rear frame member 24 may contain sidewalls 26, 28 on opposite sides that are integrally formed therewith and extend outwardly from the rear frame member 24. In other embodiments, sidewalls 26 and 28 can be formed separate from the rear frame member 24 and coupled thereto.

The rear frame member 24 also includes opposite ends 30 and 32. The rear frame member 24 may be configured to be disposed against a wall or other vertical surface of a building. The cabinet 20 may also include a top end frame member 40 coupled to end 30 of the rear frame member 24 that is opposed to the end 32 coupled to the bottom end frame member 22.

Returning to FIG. 1, the cabinet 20 further includes a front frame member 50 that is coupled to the rear frame member 24. The frame members 22, 24, 40, and 50 collectively define an interior volume 25 (see FIG. 2) that houses the various components of the AVSU 10, as disclosed herein.

Figure 15:
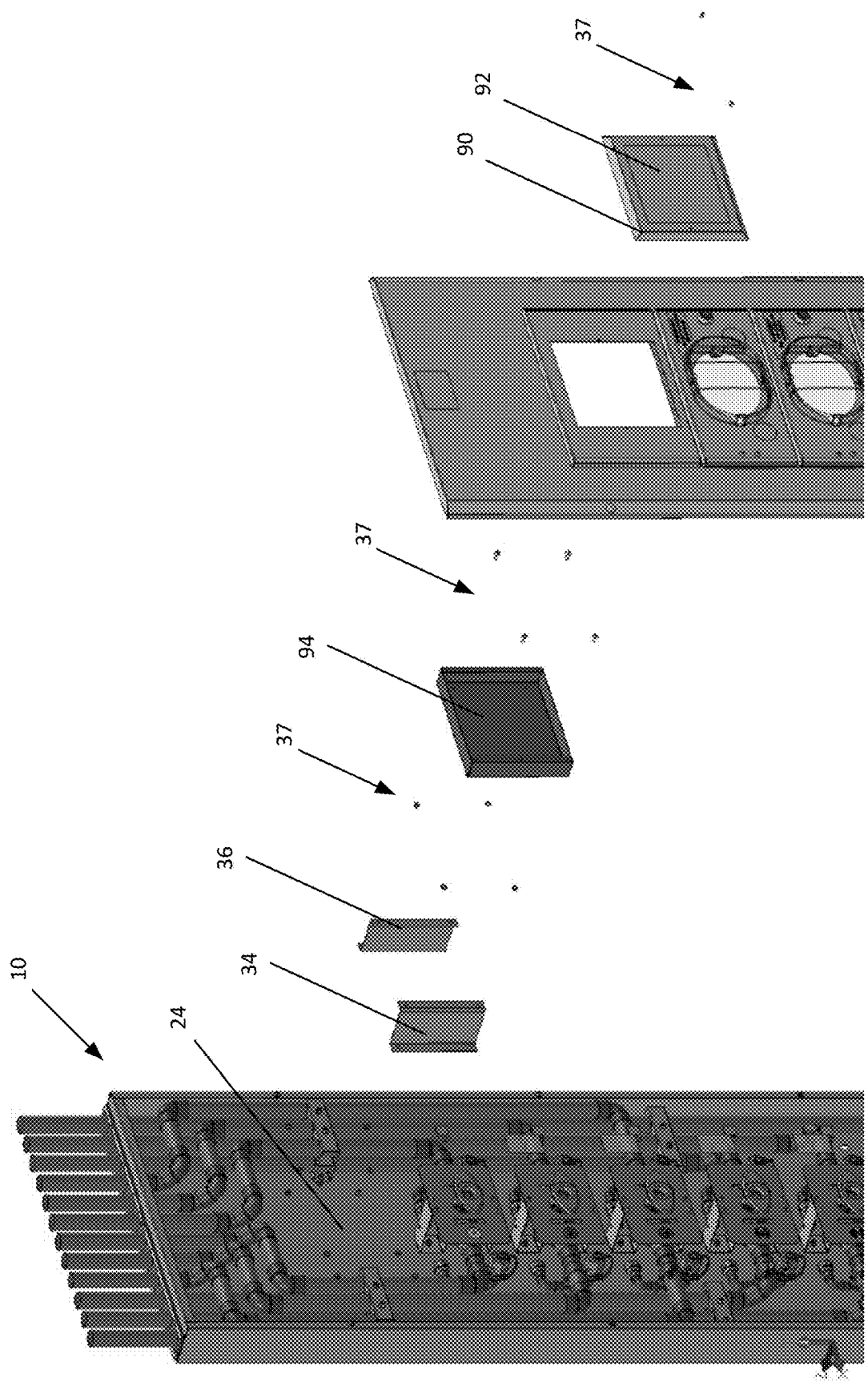
FIG. 15 illustrates an exploded perspective view of several components of the control panel of the AVSU illustrated in FIG. 1.

The control panel 90 of the AVSU 10 may be any type of display 92 with controls/inputs (e.g., touch screen, buttons, dials, etc.) configured to operate the AVSU 10 and to provide the status of the AVSU 10 and/or a connected medical gas and vacuum system. As best illustrated in FIG. 15, the control panel 90 includes a display 92 that is mounted to a housing 94 that may be secured to the cabinet 20 via a pair of brackets 34 and 36 that are coupled to the rear frame member 24 of the cabinet 20 via fasteners 37.

As explained in further detail below, each of the access panels 100, 200, 300, 400, 500, and 600 may each be designed to facilitate the shutoff of a supply of gas or vacuum to a subsystem of the medical gas and vacuum system, while also providing auxiliary connections for suppling gas. While the embodiment illustrated in FIG. 1 contains six (6) access panels, the AVSU 10 according to the invention may have any number of access panels, where the number of access panels may be dependent on the application of the AVSU/number of subsystems in the gas and vacuum system.

Returning to FIG. 2 in which the AVSU 10 is illustrated with the front frame member 50 and access panels 100, 200, 300, 400, 500, and 600 removed for illustrative purposes, disposed within the cabinet 20 of the AVSU 10 is a series of pipes, shutoff and other control valves, and auxiliary connections. As explained in further detail below, each access panel may contain an associated a pair of auxiliary connections and at least one shutoff valve that is configured to shut off the supply of gas or vacuum to a subsystem of the gas and vacuum system.

Referring to FIGS. 1 and 2, a series of pipes 1000 extends into or out of the AVSU 10 at the top end 14 of the AVSU 10 (i.e., through the top end frame member 40). Each pipe of the series of pipes 1000 may be configured to either deliver gas to a shutoff valve associated with an access panel (referred to as an inlet pipe), or to deliver gas from a shutoff valve associated with an access panel (referred to as an outlet pipe). Thus, in the illustrated embodiment, because the AVSU 10 is equipped with six access panels 100, 200, 300, 400, 500, and 600 (and thus six shutoff valves 105, 205, 305, 405, 505, and 605), twelve pipes 1010, 1020, 1030, 1040, 1050, 1060, 1070, 1080, 1090, 1100, 1110, and 1120 extend from the top end 14 of the AVSU 10.

FIG. 2 illustrates the layout of the pipes 1010, 1020, 1030, 1040, 1050, 1060, 1070, 1080, 1090, 1100, 1110, and 1120 of the AVSU 10 within the interior volume 25 of the cabinet 20. The six leftmost pipes 1010, 1020, 1030, 1040, 1050, and 1060 extending from the top end 14 of the AVSU 10 also extend into the interior volume 25 of the cabinet 20, where the fourth pipe 1040, the fifth pipe 1050, and the sixth pipe 1060 are routed within the cabinet 20 to overlap the first pipe 1010, the second pipe 1020, and the third pipe 1030, respectively, between the rear frame member 24 and the front frame member 50, collectively forming an overlapping arrangement 1004. Similarly, and in a mirror configuration to the six leftmost pipes 1010, 1020, 1030, 1040, 1050, and 1060, the six rightmost pipes 1070, 1080, 1090, 1100, 1110, and 1120 extending from the top end 14 of the AVSU 10 also extend into the interior volume 25 of the cabinet 20, where the seventh pipe 1070, the eighth pipe 1080, and the ninth pipe 1090 are routed within the cabinet 20 to overlap the tenth pipe 1100, the eleventh pipe 1110, and the twelfth pipe 1120, respectively, between the rear frame member 24 and the front frame member 50, collectively forming another overlapping arrangement or configuration 1006.

Figure 16A:
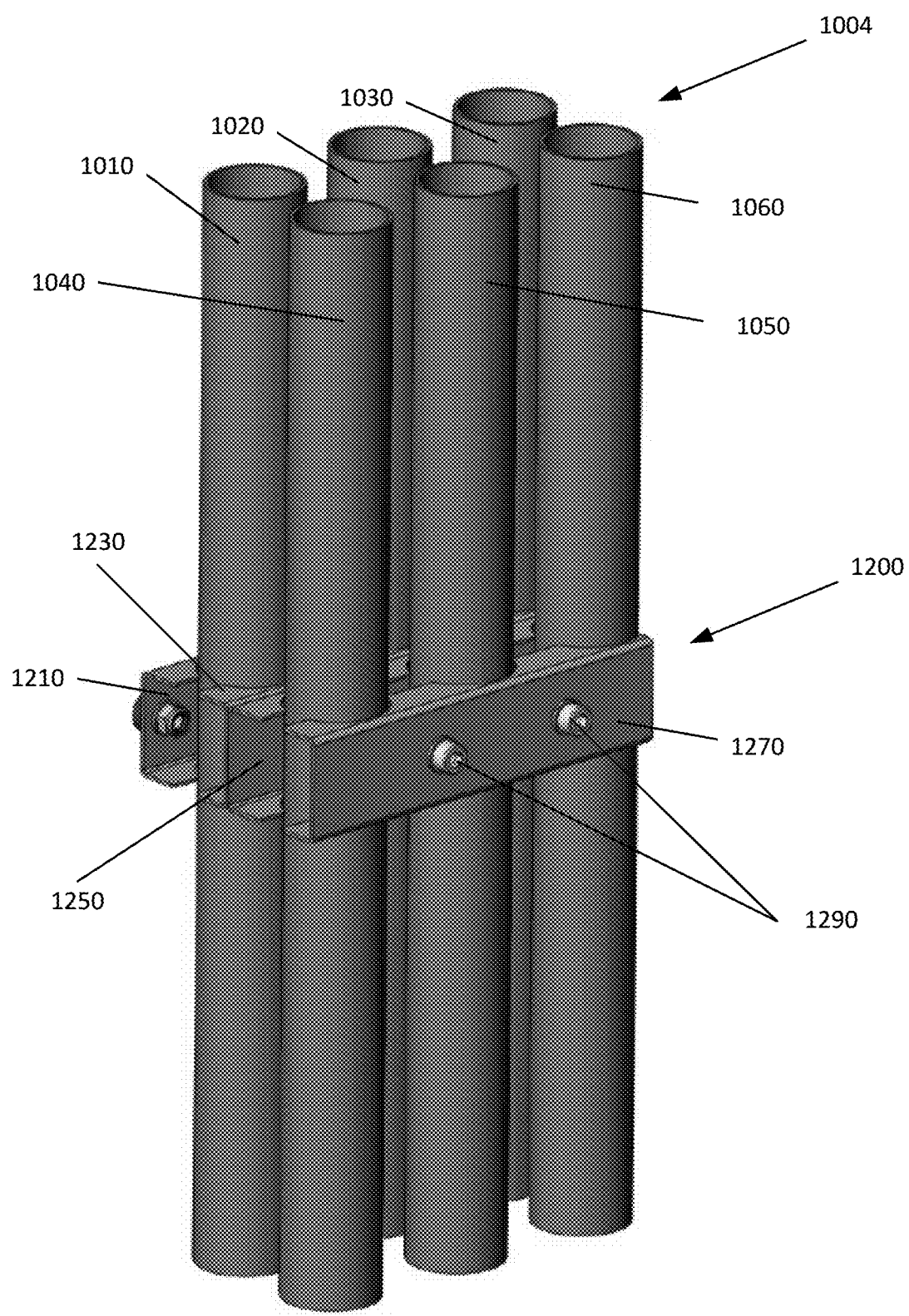
FIG. 16A illustrates a perspective view of a clamping arrangement and some of the pipes of the AVSU illustrated in FIG. 1.
Figure 16B:
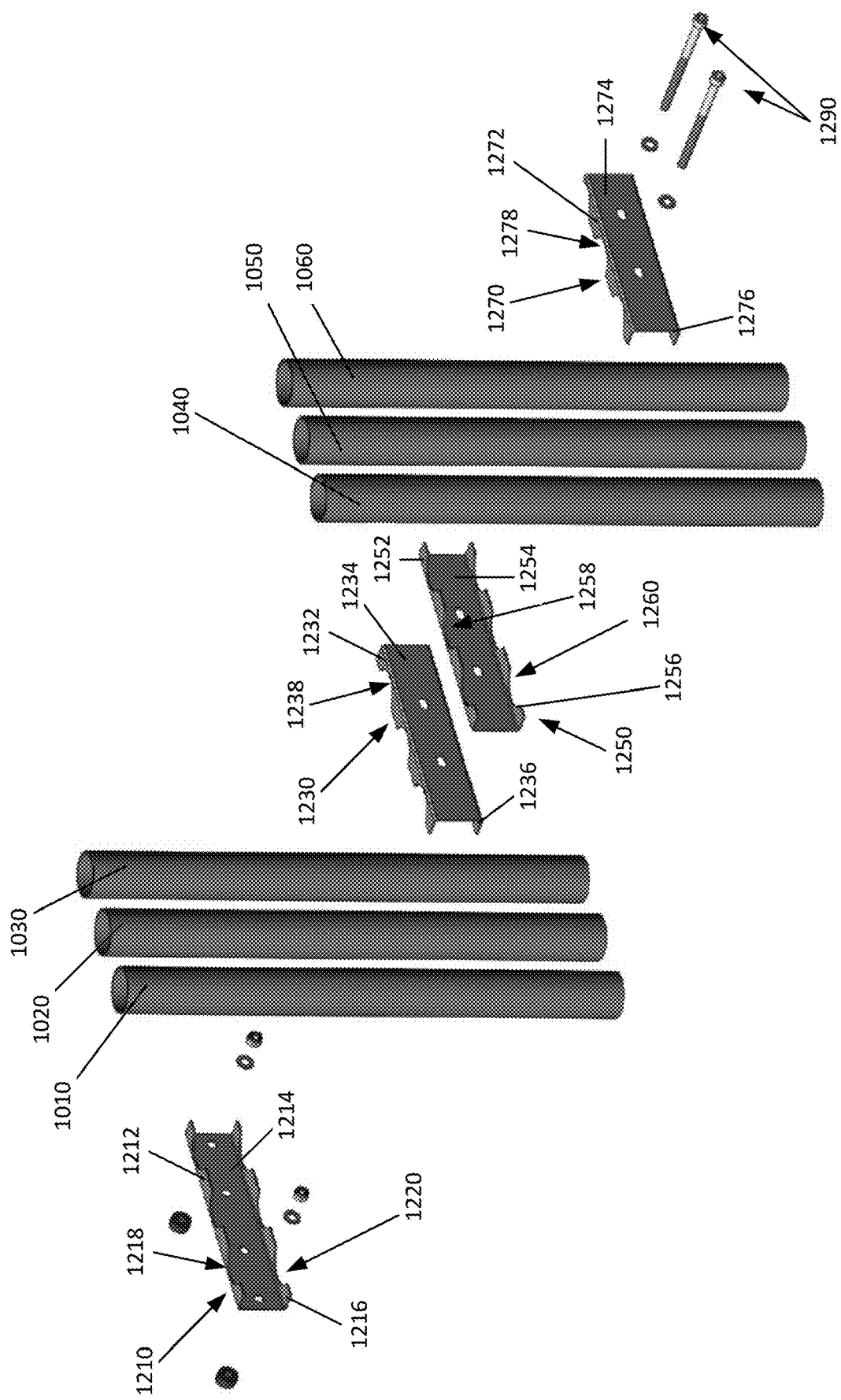
FIG. 16B illustrates an exploded perspective view of the clamping arrangement and the pipes illustrated in FIG. 16A.

Referring to FIGS. 16A and 16B, the six pipes in the overlapping arrangement 1004 are held together and in place within the interior volume 25 of the cabinet 20 by a clamping mechanism 1200. The clamping mechanism 1200 includes an innermost bracket or bracket portion 1210, two intermediate brackets or bracket portions 1230 and 1250 and an outermost bracket or bracket portion 1270 that, collectively, clamp the pipes 1010, 1020, 1030, 1040, 1050, and 1060 together. It is to be understood that another clamping mechanism similar to clamping mechanism 1200 is used to clamp the overlapping arrangement 1006 of pipes 1070, 1080, 1090, 1100, 1110, and 1120 together.

As illustrated in FIG. 16B, the innermost bracket 1210 includes a top portion 1212, a middle portion 1214, and a bottom portion 1216, where each of the top portion 1212 and the bottom portion 1216 of innermost bracket 1210 contains a series of semi-circular cutouts 1218 and 1220, respectively. Similarly, the outermost bracket 1270 includes a top portion 1272, a middle portion 1274, and a bottom portion 1276, where each of the top portion 1272 and the bottom portion 1276 of outermost bracket 1270 contains a series of semi-circular cutouts, with only cutouts 1278 being shown in FIG. 16B. Intermediate bracket 1230 includes a top portion 1232, a middle portion 1234, and a bottom portion 1236, where each of the top portion 1232 and the bottom portion 1236 of intermediate bracket 1230 contains a series of semi-circular cutouts, with only cutouts 1238 being shown in FIG. 16B. Also, intermediate bracket 1250 includes a top portion 1252, a middle portion 1254, and a bottom portion 1256, where each of the top portion 1252 and the bottom portion 1256 of intermediate bracket 1250 contains a series of semi-circular cutouts 1258 and 1260, respectively. For each of the brackets 1210, 1230, 1250, and 1270, their respective top portions 1212, 1232, 1252, and 1272 and bottom portions 1216, 1236, 1256, and 1276 mirror one another.

As illustrated in FIGS. 16A and 16B, the innermost bracket 1210 and the first intermediate bracket 1230 clamp three of the pipes (e.g., the first pipe 1010, the second pipe 1020, and the third pipe 1030), while the second intermediate bracket 1250 and the outermost bracket 1270 clamp three different pipes (e.g., the fourth pipe 1040, the fifth pipe 1050, and the sixth pipe 1060). The middle portions 1234 and 1254 of the two intermediate brackets 1230 and 1250 may be in abutment with one another, while one or more fasteners 1290 may extend through each of the middle portions 1214, 1234, 1254, and 1274 of the four brackets 1210, 1230, 1250, and 1270 to secure the brackets to one another to clamp the six pipes between the four brackets. In addition, the middle portion 1214 of the innermost bracket 1210 may be coupled to the rear frame member 24 to secure the clamping mechanism 1200, and ultimately positioning the six pipes, within the interior volume 25 of the cabinet 20. Any number of clamping mechanisms 1200 may be utilized within the interior volume 25 of the cabinet 20 in order to arrange and secure the pipes within the interior volume 25 of the cabinet 20. In an alternative arrangement, the innermost bracket 1210 and the first intermediate bracket 1230 can clamp the tenth pipe 1100, the eleventh pipe 1110, and the twelfth pipe 1120, and the second intermediate bracket 1250 and the outermost bracket 1270 can clamp the seventh pipe 1070, the eighth pipe 1080, and the ninth pipe 1090.

This routing of the pipes enable the six unit AVSU 10 illustrated in FIGS. 1 and 2 to have a more compact size than other six unit AVSU's. For example, a conventional six unit AVSU may typically have the dimensions of 1900 mm×600 mm×130 mm (height×width×depth), where the illustrated six unit AVSU 10 has more compact dimensions of 1465 mm×550 mm×137 mm (height×width×depth). The routing of the pipes within the AVSU 10 enable any AVSU cabinet that contains the internal pipe routing disclosed herein to have more compact dimensions (especially in the height and width dimensions) than a counterpart conventional AVSU. For example, a three (3) unit AVSU that contains the internal pipe routing disclosed herein may have more compact dimensions than a conventional three (3) unit AVSU.

Figure 3A:
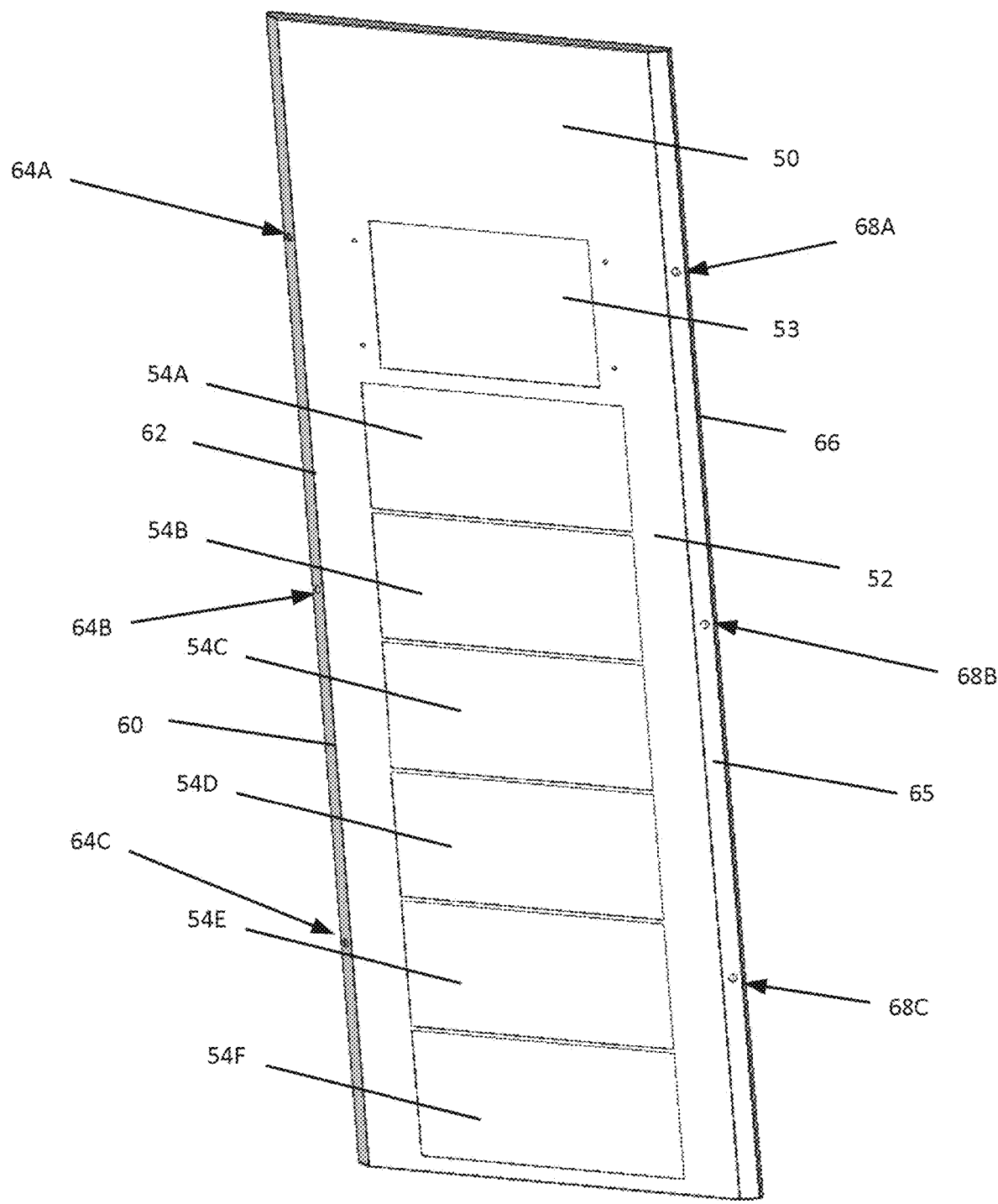
FIG. 3A illustrates a front perspective view of the front frame member of the AVSU illustrated in FIG. 1.
Figure 3B:
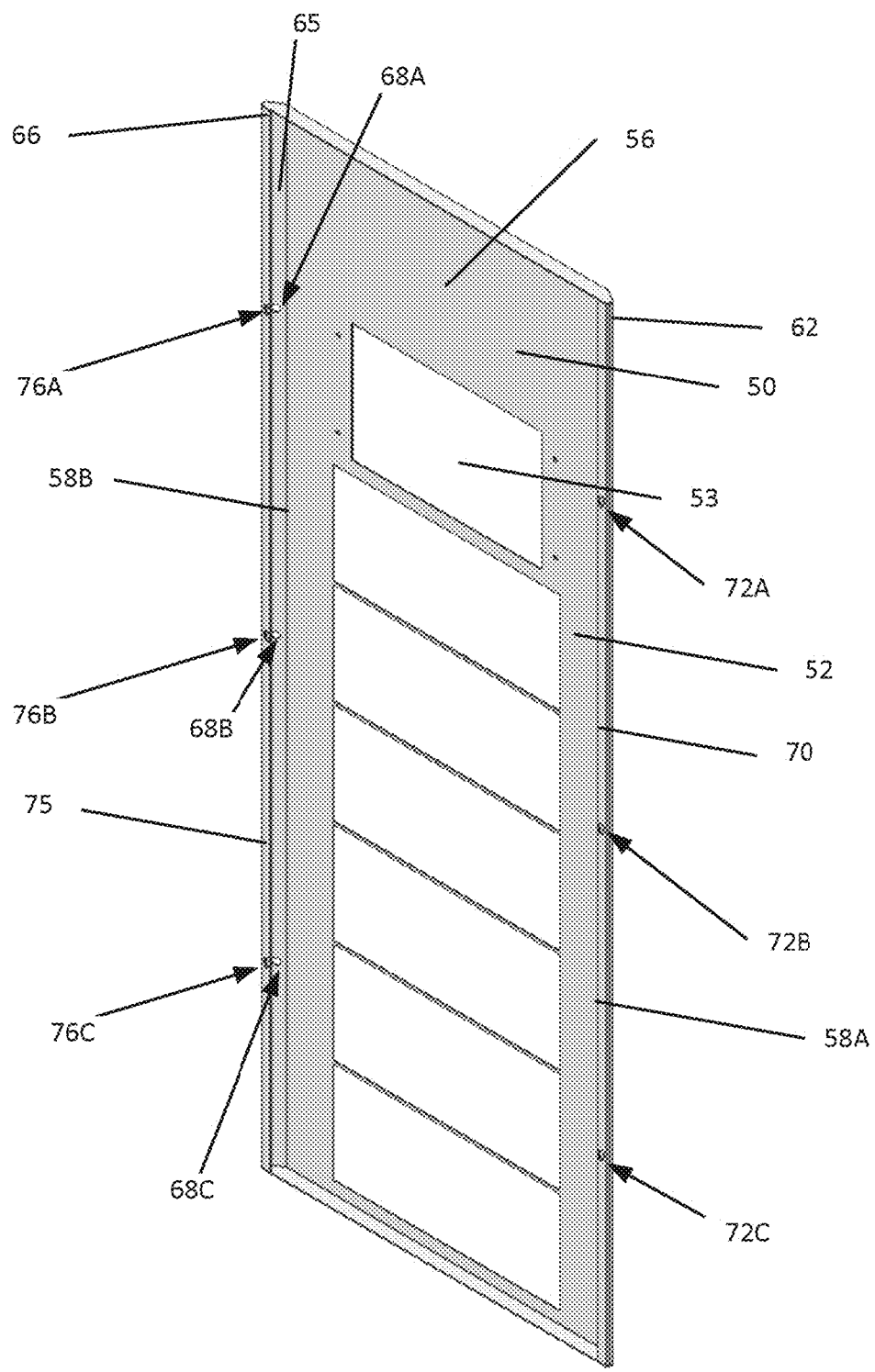
FIG. 3B illustrates a rear perspective view of the front frame member illustrated in FIG. 3A.

FIGS. 3A and 3B illustrate perspective front and rear views of the front frame member 50. The front frame member 50 of the cabinet 20 of the AVSU 10 may be attached to the rear frame member 24 by a single operator because of the arrangement of the fastener openings 58 on the front frame member 50 and the fasteners 38 on the rear frame member 24 (see FIG. 2). As illustrated in FIGS. 3A and 3B, the front frame member 50 includes a front planar portion 52 with an interior side 56, two angular side portions 60 and 65 on opposing sides 58A and 58B of the front planar portion 52, and two rear portions 70 and 75 extending from the outermost edges 62 and 66 of the two angular side portions 60 and 65, respectively, towards one another. The two rear portions 70 and 75 may be spaced from, but oriented parallel to the front planar portion 52, while each of the two angular side portions 60 and 65 is oriented to intersect both the front planar portion 52 and one of the rear portions 70 and 75.

As illustrated, the front frame member 52 includes a square-like opening 53 and several rectangular openings 54A, 54B, 54C, 54D, 54E, and 54F disposed along the front planar portion 52. The uppermost square-like opening 53 may be configured to accommodate the control panel 90, while the remaining rectangular openings 54A, 54B, 54C, 54D, 54E, and 54F may be configured to accommodate different ones of the plurality of access panels. The square-like opening 53 and the rectangular openings 54A, 54B, 54C, 54D, 54E, and 54F may be formed in the front planar portion 52 such that they are spaced equidistant from the two angular side portions 60 and 65 of the front frame member 50. The square-like opening 53 and the rectangular openings 54A, 54B, 54C, 54D, 54E, and 54F may be of any other shape, especially when the access panels and the control panel have different shapes The front frame member 50 includes a series of attachment openings. The attachment openings include a plurality of outermost attachment openings 64A, 64B, and 64C formed in angular side portion 60 (see FIG. 3A) and a plurality of outermost attachment openings 68A, 68B, and 68C formed in angular side portion 65 (see FIGS. 3A and 3B). As shown in FIG. 3B, the attachment openings also include a plurality of innermost attachment openings 72A, 72B, and 72C formed in rear portion 70 and a plurality of innermost attachment openings 76A, 76B, and 76C formed in rear portion 75. As shown, the corresponding ones of innermost attachment openings 72A, 72B, 72C, 76A, 76B, and 76C and the outermost attachment openings 64A, 64B, 64C, 68A, 68B, and 68C may be aligned horizontally with respect to each another.

Figure 4A:
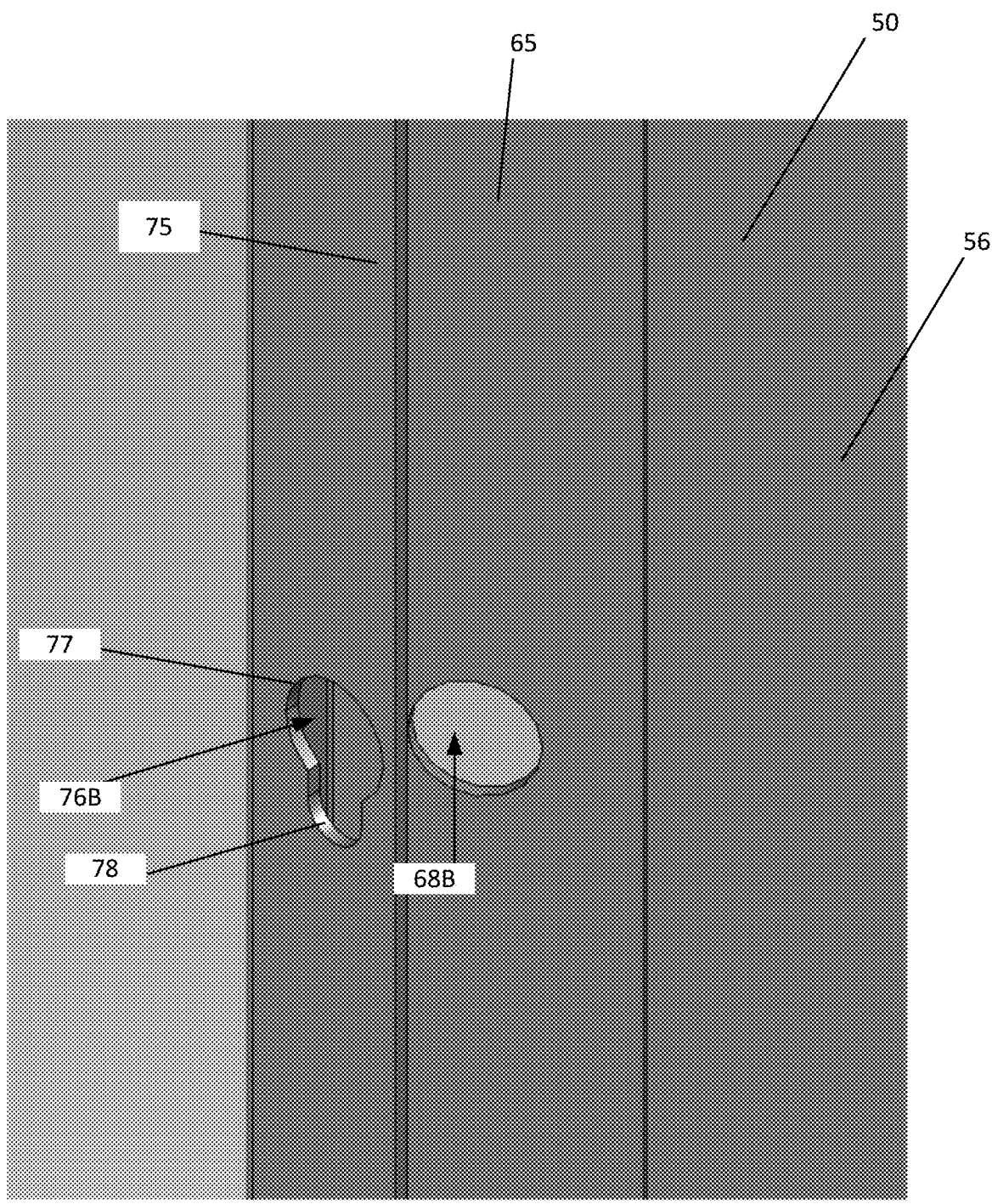
FIG. 4A illustrates a front perspective view of some of the attachment openings of the front frame member illustrated in FIG. 3A.

As illustrated in FIG. 4A, outermost attachment opening 68B formed in angular side portion 65 may be substantially circular. While only outermost attachment opening 68B is illustrated in FIG. 4A, it is to be understood that the other outermost attachment openings in angular side portion 65 have the same structure to opening 68B. The innermost attachment opening 76B formed in rear portion 75 may include a substantially circular portion 77 and a slot portion 78 connected thereto. The slot portion 78 of the innermost attachment opening 76B may be smaller in width than that of the circular portion 77. The relative positioning of the interior side 56 of the front frame member 50 with the angular side portion 65 and the rear portion 75 is illustrated.

Figure 4B:
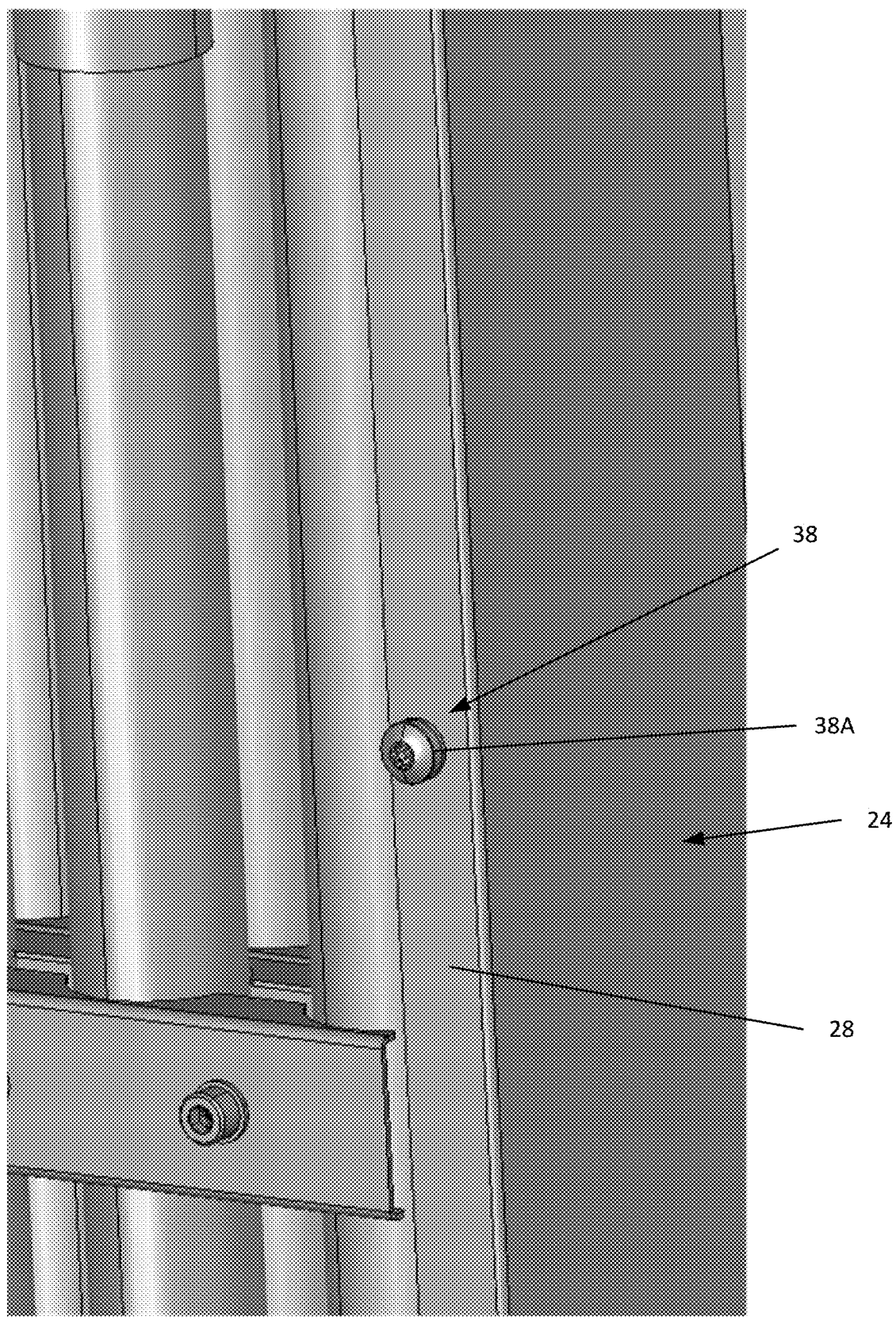
FIG. 4B illustrates a front perspective view of an attachment fastener of the cabinet of the AVSU illustrated in FIG. 1.

As illustrated in FIG. 4B, several attachment fasteners 38 are coupled to the sidewall 28 of the rear frame member 24. The attachment fastener 38 may be a screw with a head 38A and a shank 38B (see FIG. 4F). In other embodiments, the attachment fastener 38 may be another type of fastener that contains at least a first portion (e.g., head) and a second portion (e.g., shank), where the first portion is wider than the second portion.

Figure 4C:
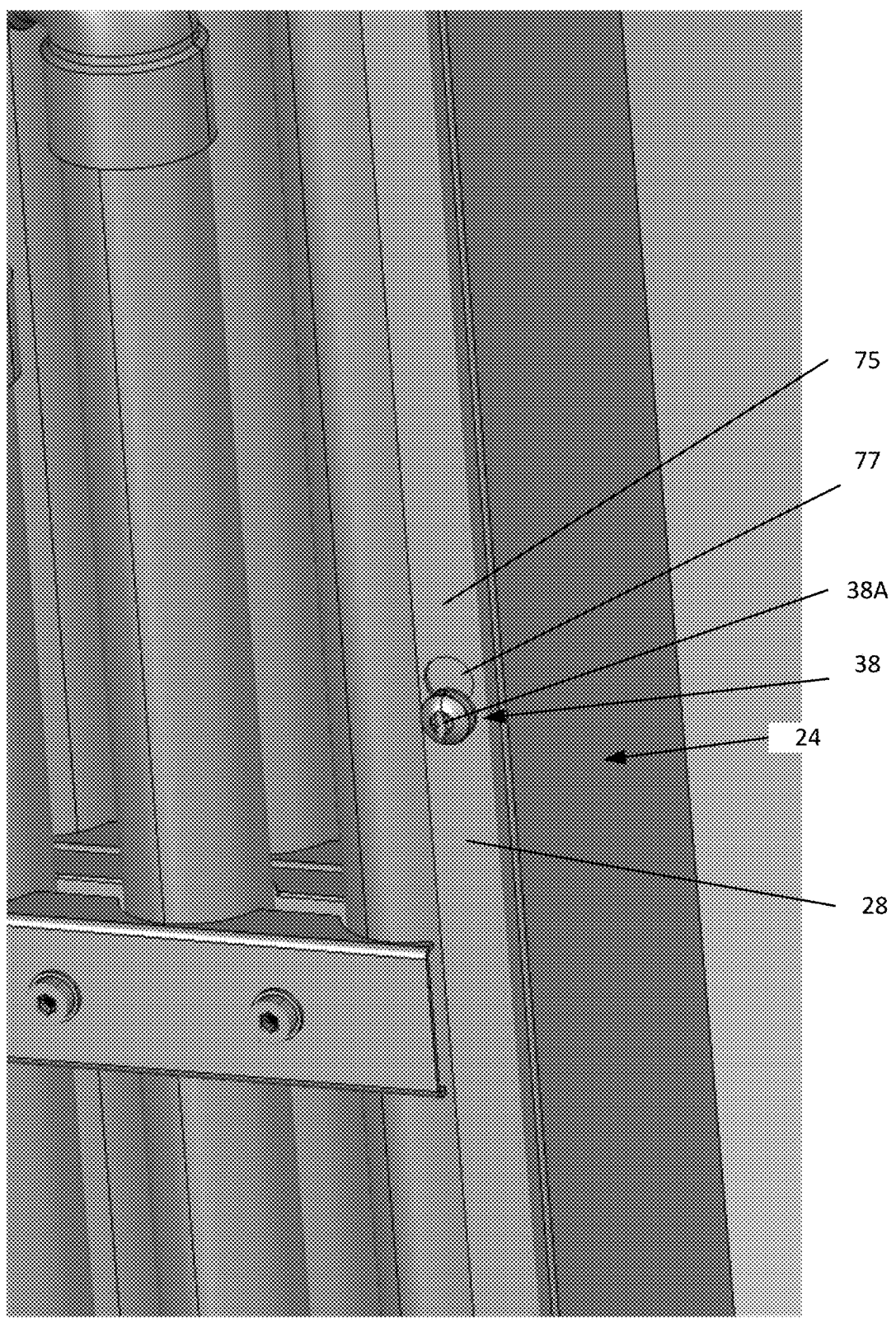
FIG. 4C illustrates a front perspective view of a portion of the front frame member illustrated in FIG. 3A coupled to the cabinet via the attachment fastener illustrated in FIG. 4B.
Figure 4D:
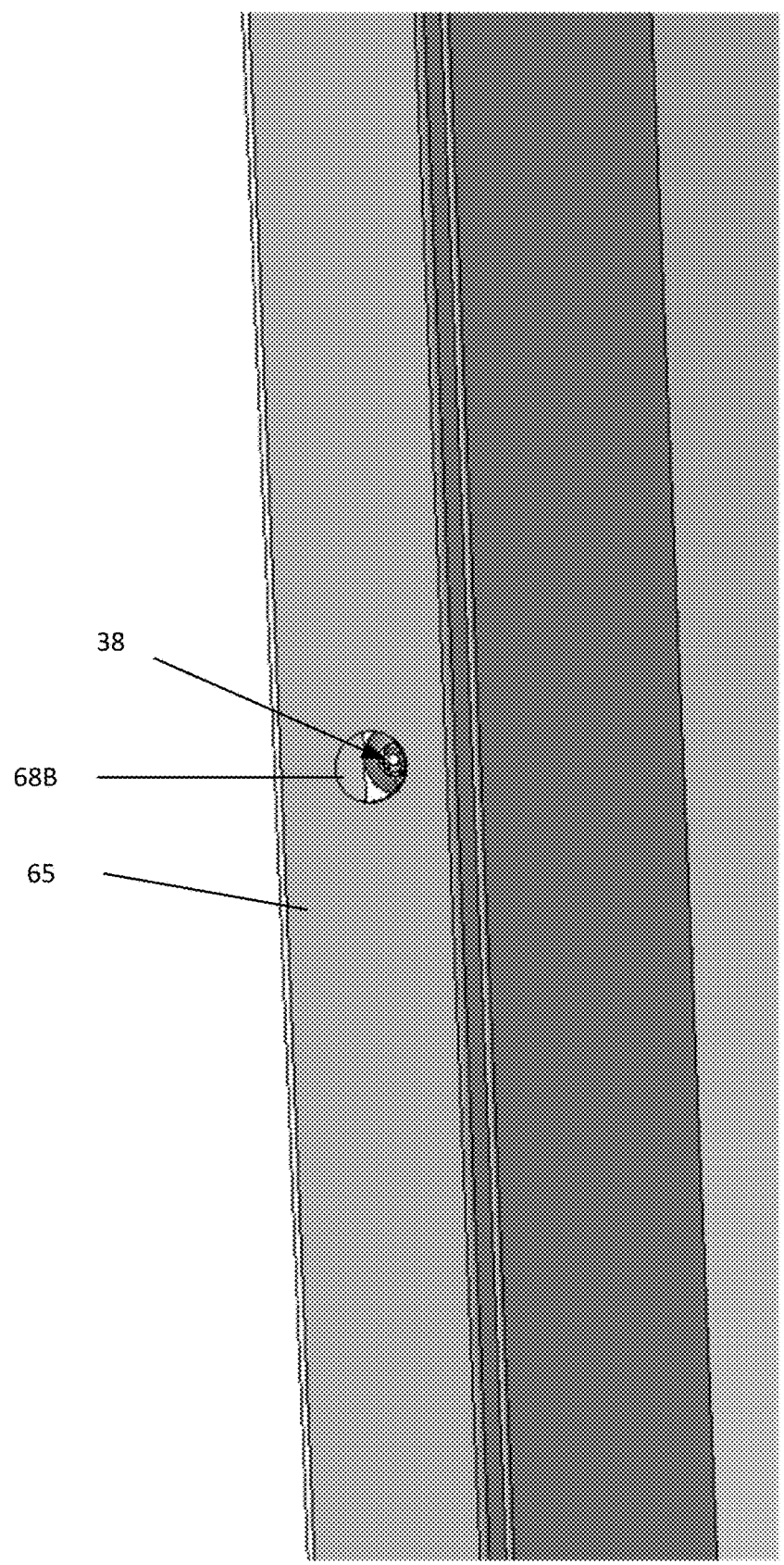
FIG. 4D illustrates a front perspective view of an outermost attachment opening of the front frame member illustrated in FIG. 3A and an associated attachment fastener visible through the outermost attachment opening.
Figure 4E:
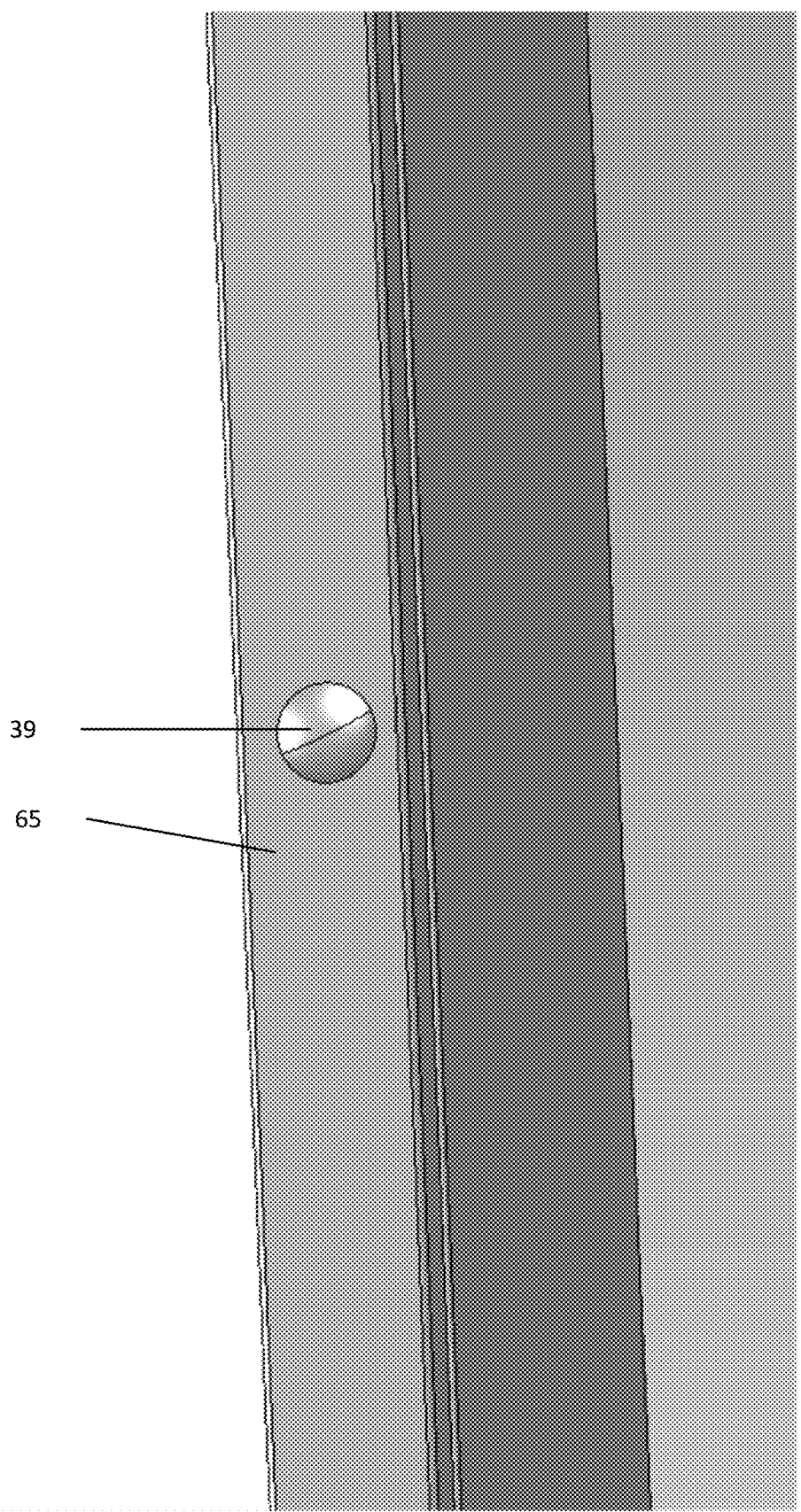
FIG. 4E illustrates a front perspective view of an attachment cap disposed in the outermost attachment opening of the front frame member illustrated in FIG. 3A.
Figure 4F:
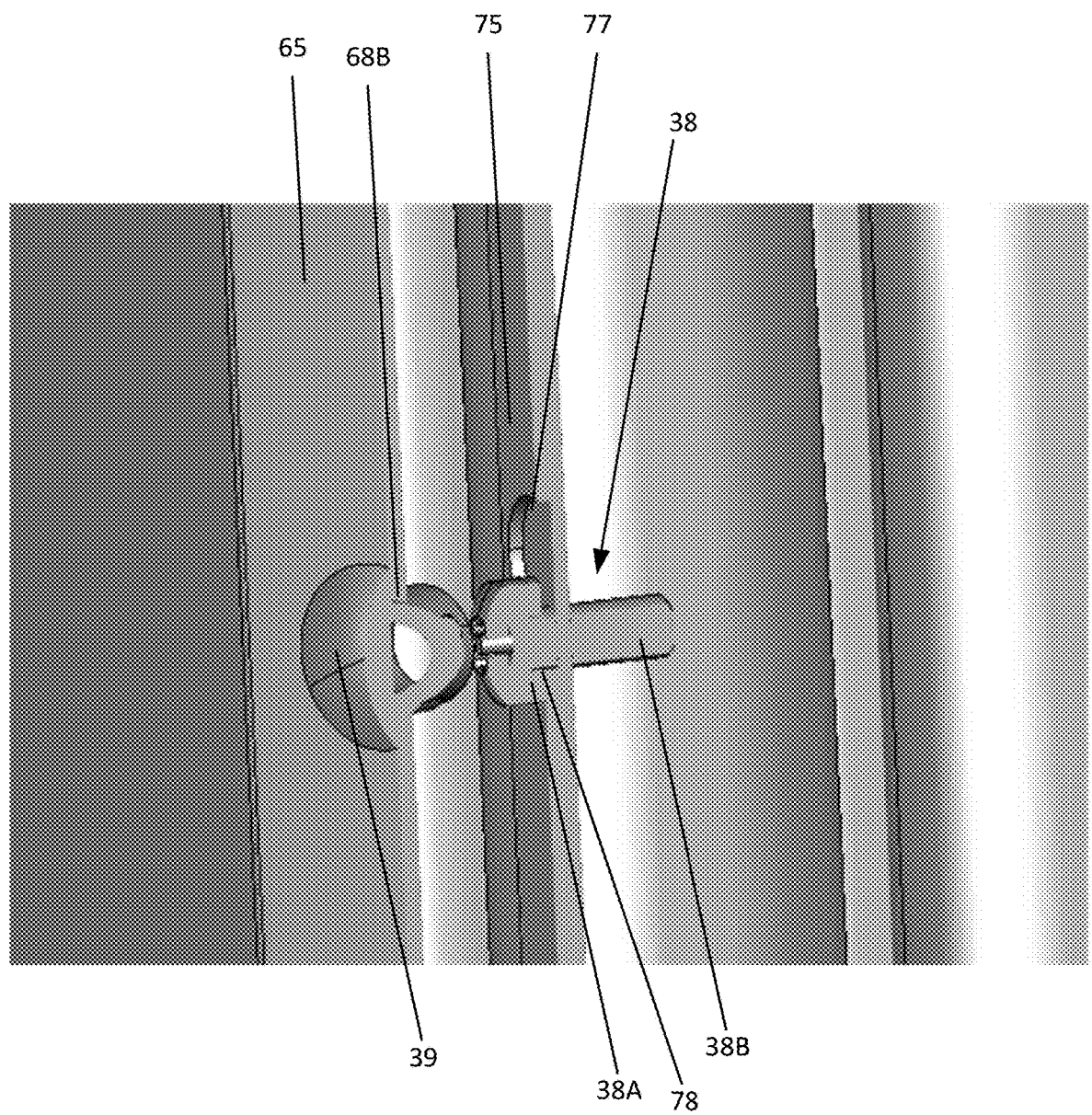
FIG. 4F illustrates a cross-sectional view of a portion of the front frame member illustrated in FIG. 3A coupled to the cabinet via the attachment fastener illustrated in FIG. 4B and with the attachment cap illustrated in FIG. 4E disposed within the outermost attachment opening.

As illustrated in FIGS. 4C and 4F, the front frame member 50 may be attached to the rear frame member 24 by initially aligning the circular portion 77 of each innermost attachment opening 72A, 72B, 72C, 76A, 76B, and 76C with the attachment fasteners 38 coupled to the sidewalls 26 and 28 of the rear frame member 24. The head 38A of the attachment fasteners 38 may first be inserted through the circular portion 77 of the aligned innermost attachment opening 72A, 72B, 72C, 76A, 76B, or 76C until the circular portions 77 of the innermost attachment openings encircles the shanks 38B of the attachment fasteners 38. The front frame member 50 may then be moved with respect to the rear frame member 24 so that the shanks 38B are disposed within, and at least partially encircled by, the slot portions 78 of the innermost attachment openings 72A, 72B, 72C, 76A, 76B, and 76C.

As shown in FIG. 4D, the attachment fastener 38 is visible, and capable of being engaged by a tool, through the outermost attachment opening. Once the shanks 38B of the attachment fasteners 38 are disposed within the slot portions 78 of the aligned innermost attachment openings 72A, 72B, 72C, 76A, 76B, and 76C, the heads 38A of the attachment fasteners 38 may be engaged by a tool through the outermost attachment openings 64A, 64B, 64C, 68A, 68B, and 68C to tighten the fasteners 38 to clamp the rear frame member 24 between the heads 38A of the attachment fasteners 38 and the sidewalls 26 and 28 of the rear frame member 24 (e.g., by tightening or screwing the attachment fasteners 38). This effectively secures the front frame member 50 to the rear frame member 24. As illustrated in FIGS. 4E and 4F, an attachment cap 39 may then be disposed within the outermost attachment opening 64A, 64B, 64C, 68A, 68B, and 68C to cover up access to each of the attachment fasteners 38.

While FIGS. 4A-4F illustrate only one pair of an outermost attachment opening and an innermost attachment opening, one attachment fastener, and one attachment cap, the associated description and illustration apply to the other outermost attachment openings and innermost attachment openings, the other attachment fasteners, and the other attachment caps of the AVSU since they are substantially identical to one another.

The following description of the access panels references one or two particular access panels as illustrated in the figures. It is to be understood that each of the access panels is similar in structure and in function, and accordingly, the description relating to one of the access panels applies to all of the access panels.

Figure 5:
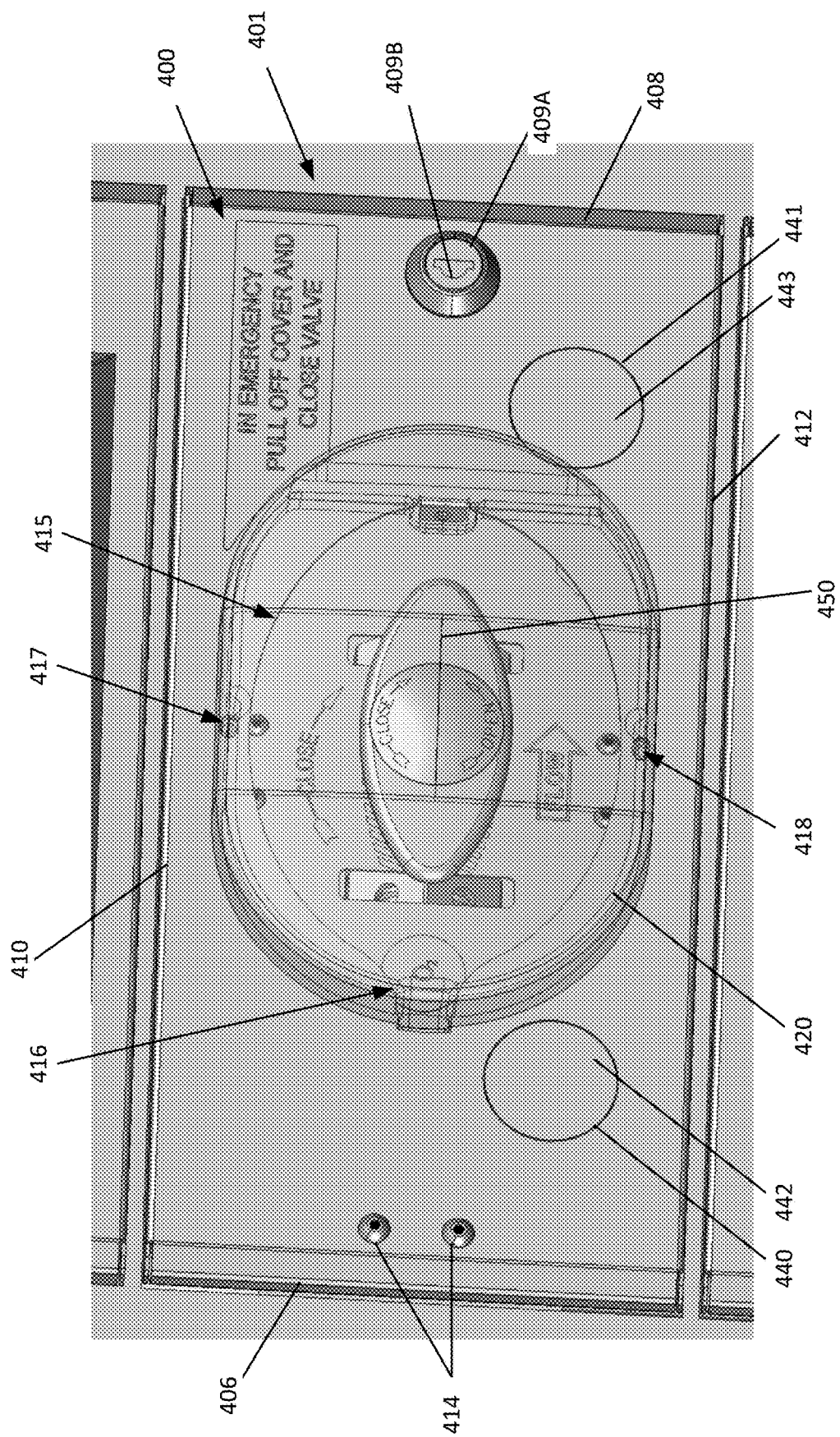
FIG. 5 illustrates a front view of an access panel of the AVSU illustrated in FIG. 1.

Turning to FIGS. 5, 6A, 6B, 7, 8A and 8B, illustrated are isolated views of access panels 400 or 600 and some of the components of the AVSU 10 disposed in proximity to/behind the particular access panel 400 or 600. Referring to FIG. 5, the access panel 400 may have a first side 406, an opposite second side 408, a top side 410 spanning from the first side 406 to the second side 408, and a bottom side 412 opposite the top side 410 that also spans from the first side 406 to the second side 408. Disposed proximate to the first side 406 is a pair of fasteners 414 that secures the access panel 400 to a hinge mechanism (see hinge mechanisms 411 or 611 best shown in FIGS. 6A and 6B with access panels 400 or 600 removed) disposed within the cabinet 20 of the AVSU 10 with respect to one of the access panel openings 54A, 54B, 54C, 54D, 54E, and 54F in the front frame member 50.

Figure 6A:
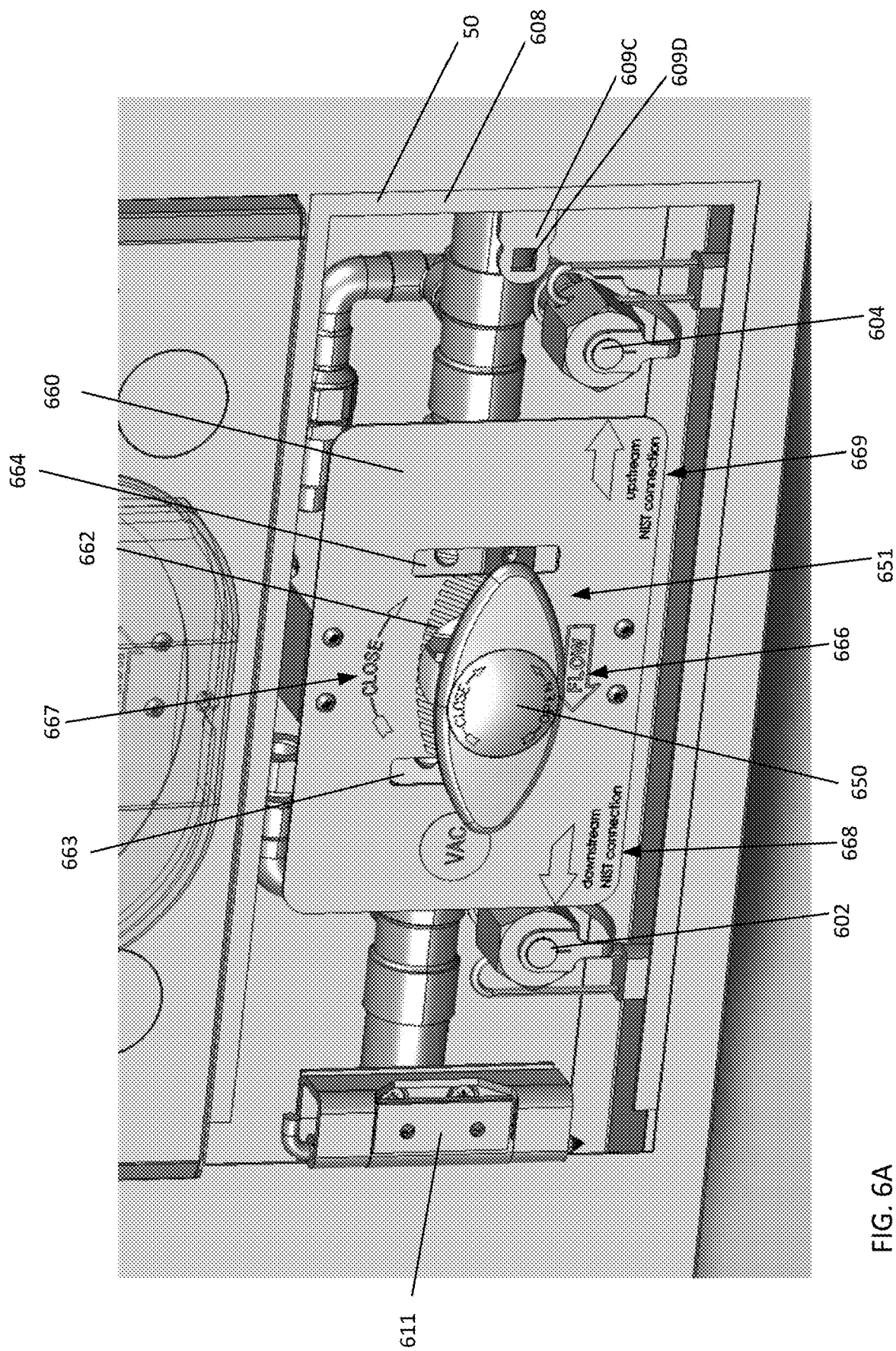
FIG. 6A illustrates a perspective front view of the components of the AVSU illustrated in FIG. 1 that are located behind an access panel.

As shown in FIG. 5, disposed proximate to the second side 408 is a lock 409A that has a keyhole 409B that may be configured to lock or secure the access panel 400 in the closed position 401. Referring to FIG. 6A, located proximate to the second side 608 is an engagement arm 609C with a mounting opening 609D for coupling the arm 609C to the lock.

Figure 6B:
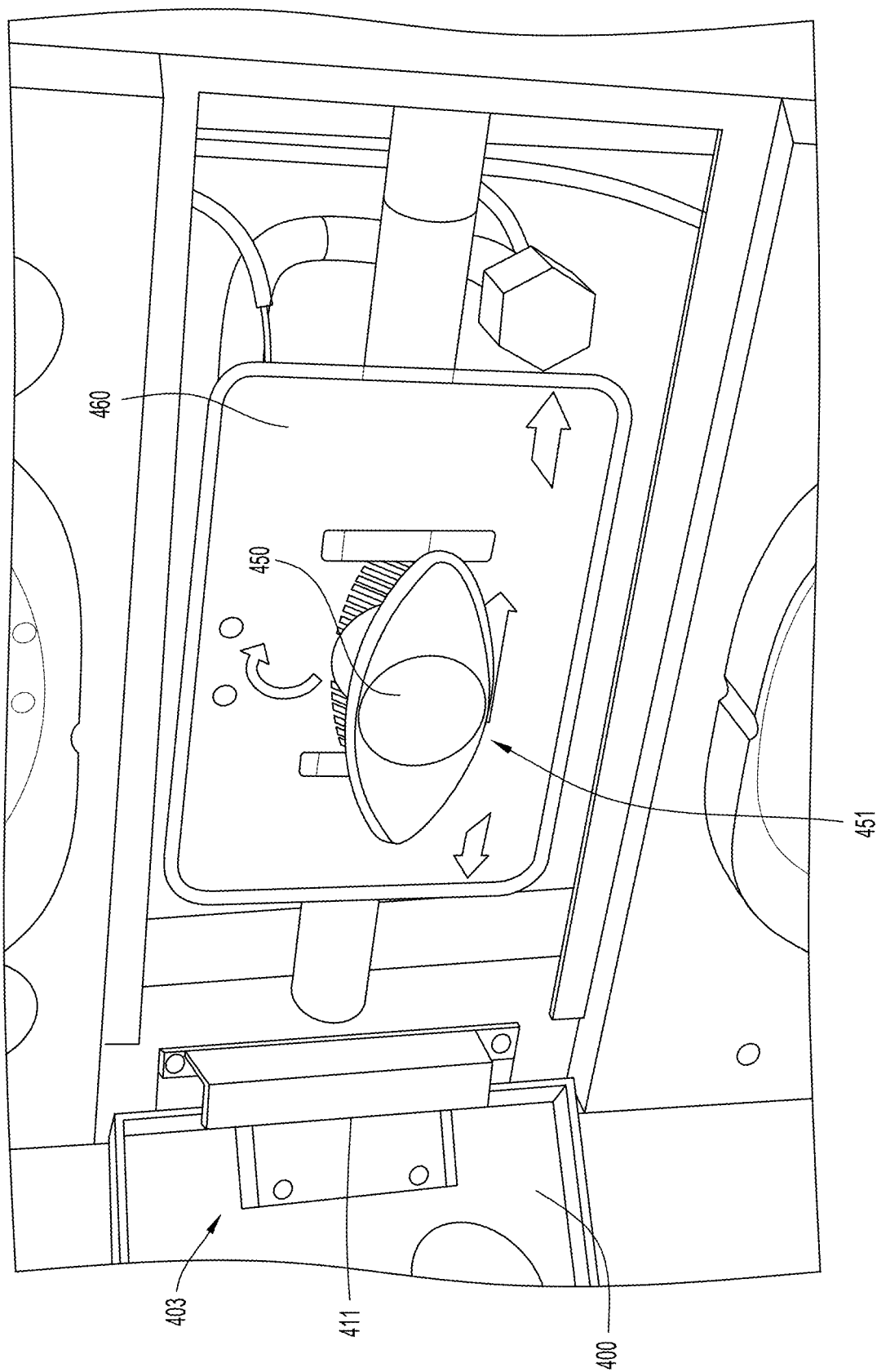
FIG. 6B illustrates another perspective front view of several components of another embodiment of an AVSU that are located behind an access panel that has been rotated to the opening position.
Figure 7:
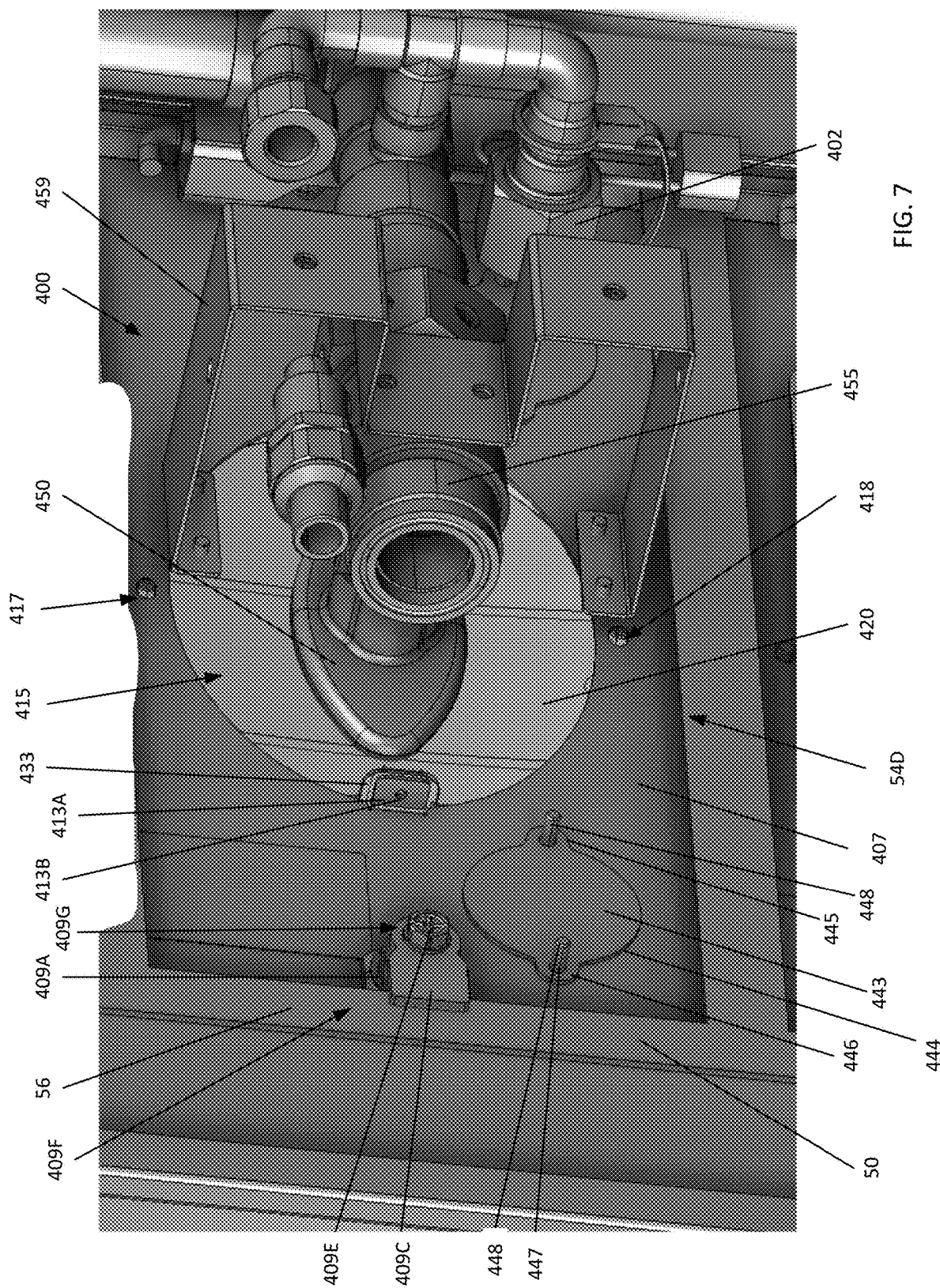
FIG. 7 illustrates a rear perspective view of the internal components behind an access panel according to the present invention.

As best illustrated in FIG. 7, which is a rear view from the inside of the area for access panel 400, the engagement arm 409C is mounted via fastener 409E through the mounting opening. When the lock 409A is rotated to a lock position 409F, an engagement arm 409C extends along the inner side 407 of the access panel 400 and engages the interior side 56 of the front frame member 50 proximate to the opening 54D corresponding to the access panel 400. However, an operator may engage the lock 409A with a corresponding key to rotate the lock 409A and the engagement arm 409C to an unlocked position, where the engagement arm 409C on the interior end 409G of the lock 409A extends along the inner side 407 of the access panel 400 without engaging the interior side 56 of the front frame member 50 (i.e., the engagement arm 409C extends vertically upward or downward along the inner side 407 of the access panel 400 rather than horizontally along the inner side 407 of the access panel 400). When the lock 409A is in the unlocked position, the access panel 400 may be rotated from the closed position 401 (see FIG. 5) to an opened position 403 (see FIG. 6B), where the access panel 400 rotates about a vertical axis that extends through the hinge or hinge mechanism 411. Rotating the access panel 400 to the opened position 403 (see FIG. 6B) when the lock 409A is in the unlocked position enables an operator to access both the components of the AVSU 10 disposed behind the access panel and the interior of the access panel 400 itself.

Referring to FIGS. 5 and 7, the access panel 400 further includes a central opening 415 that is disposed between the hinge fasteners 414 disposed proximate to the first side 406 and the lock 409A disposed proximate to the second side 408. Moreover, the central opening 415 may be centrally disposed in the access panel 400 such that it is equidistant from the first side 406 and second side 407, and equidistant from the top side 410 and bottom side 412 of the access panel 400.

Figure 9C:
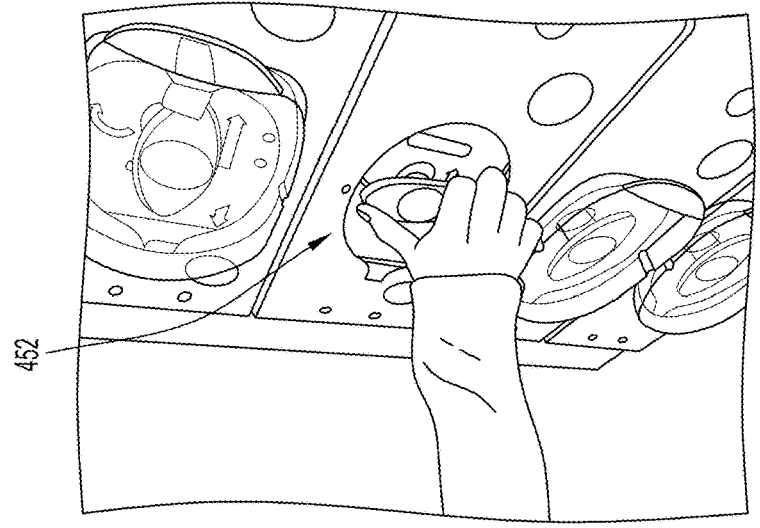
FIGS. 9A-9C illustrate perspective views of the manipulation of a handwheel from an opened position (FIG. 9A) to a closed position (FIG. 9C).
Figure 9B:
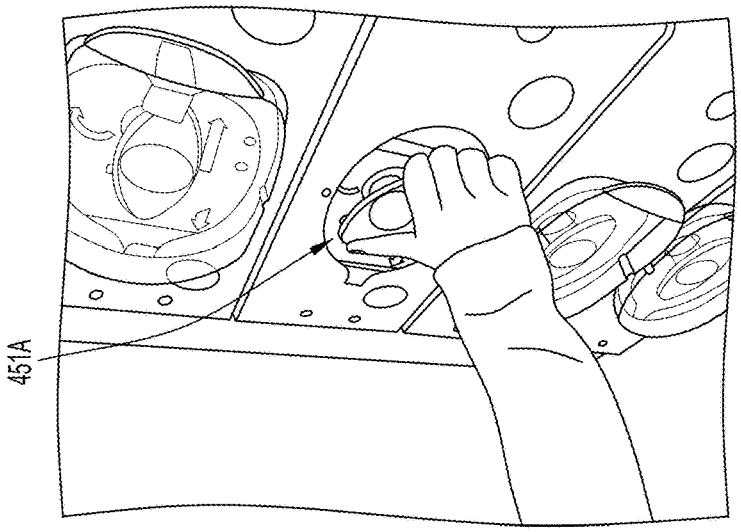
Figure 9A:
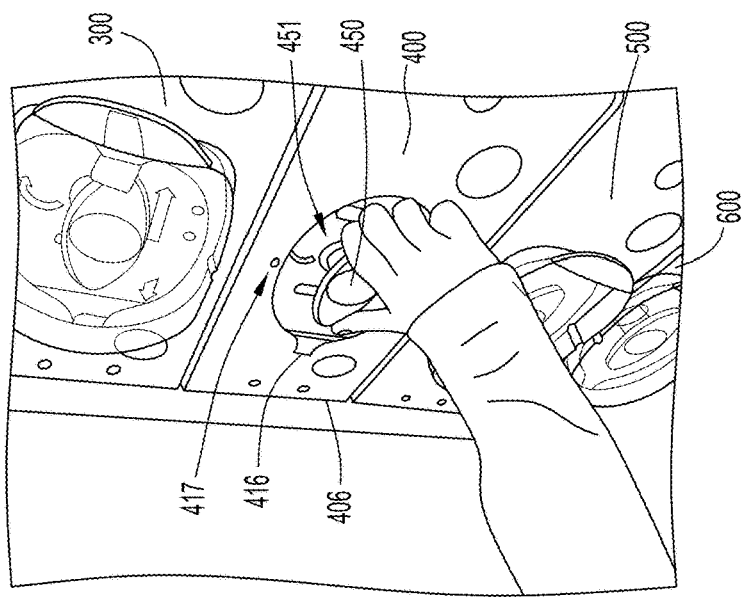

As illustrated in FIGS. 5 and 9A, the central opening 415 may have a slot or extension 416 that extends toward the first side 406 of the access panel 400. The access panel 400 may further include a pair of apertures 417 and 418 that may be smaller in size than the central opening 415 (see FIGS. 5, 7, and 9A). The apertures 417 and 418 may be vertically aligned with one another where one aperture 417 is disposed above the central opening 415 and the other aperture 418 is disposed below the central opening 415. Thus, the first aperture 417 may be disposed more proximate to the top side 410, while the second aperture 418 may be disposed more proximate to the bottom side 412. The apertures 417 and 418 may be formed in the access panel 400 such that the apertures 417 and 418 are both equidistant from the first side 406 and the second side 408.

As illustrated in FIG. 5, located over the central opening 415 and the two apertures 417 and 418 of the access panel 400 is an access panel door 420, which is shown in isolation in FIGS. 11A and 11B and discussed in more detail below. The access panel door 420 may be transparent or translucent such that objects may be visible through the door 420, and through the central opening 415.

Referring back to FIG. 5, the access panel 400 may further include a pair of auxiliary openings 440 and 441, where one auxiliary opening 440 is disposed more proximate to the first side 406 and the bottom side 412, while the second auxiliary opening 441 is disposed more proximate to the second side 408 and the bottom side 412. As further detailed below, the auxiliary openings 440 and 441 are aligned with two auxiliary connections (auxiliary connection 402 is illustrated in FIG. 7; similar to auxiliary connections 602 and 604 shown in FIG. 6A) disposed within the AVSU 10 behind the access panel 400 or 600.

In FIG. 5, the auxiliary openings 440 and 441 are covered or filled by plates 442 and 443, respectively. As illustrated in FIG. 7, in one embodiment, the plates 442 and 443 (only plate 443 is shown in FIG. 7) may be substantially circular in shape with two projections 445 and 446 that extend outward from the edge 444 of the plates 442 and 443 on opposing edges or ends of the plates 442 and 443. Each of the projections 445 and 446 may include an aperture 447 configured to receive a post 448 that extends rearward from the inner side 407 of the access panel 400 proximate to the auxiliary openings 440 and 441. Thus, during installation of the plates 442 and 443 to cover or close the auxiliary openings 440 and 441, respectively, the posts 448 may be first inserted into the apertures 447 of the projections 445 and 446 of the plates 442 and 443. The plates 442 and 443 may then be slid along the posts 448 until the plates 442 and 443 are disposed within the auxiliary openings 440 and 441 in order to cover/close the auxiliary openings 440 and 441.

Figure 8A:
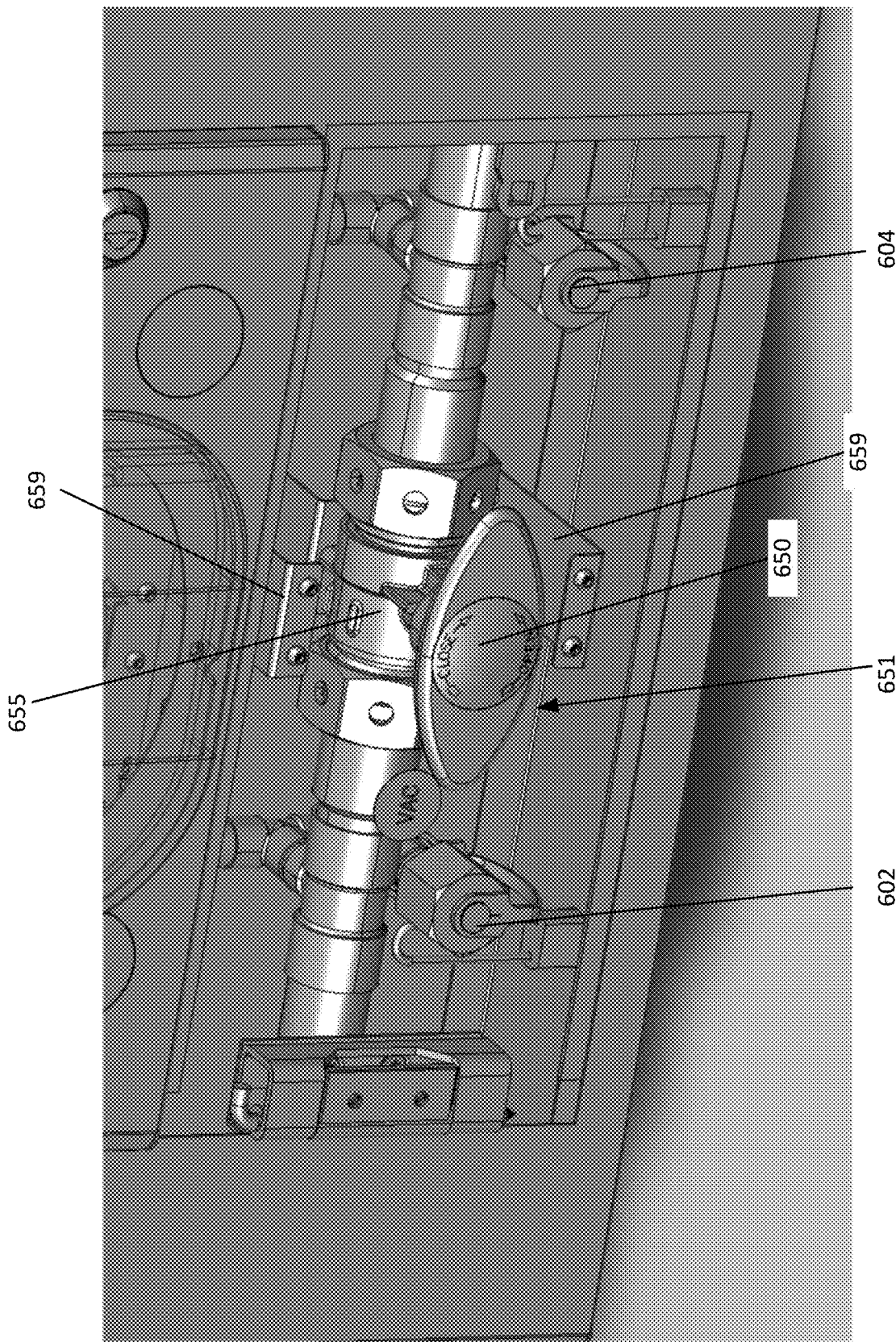
FIG. 8A illustrates a front perspective view of several internal components that are located behind an access plate.
Figure 8B:
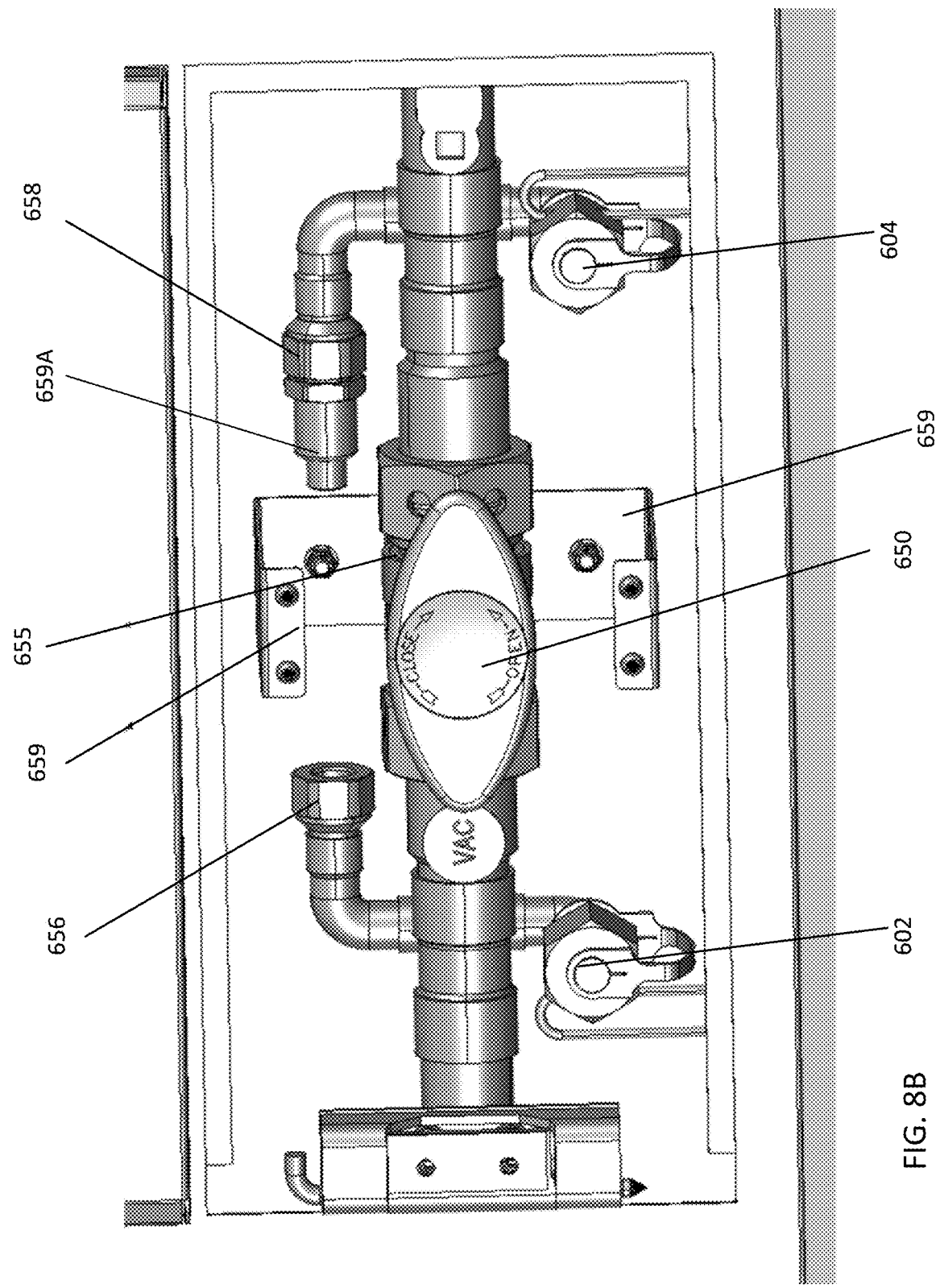
FIG. 8B illustrates a front view of the components illustrated in FIG. 8A.

As best illustrated in FIGS. 6A, 8A, 8B, and 9A-9C, disposed behind the access panel 600, and aligned with the central opening, is a handwheel 650 (see also handwheel 450 in FIGS. 5, 6B, and 7 relating to the following description). The handwheel 650 may be visible through the transparent access panel door and central opening of the access panel 600. The handwheel 650 may be operatively connected to a shutoff valve 655 (see FIGS. 8A and 8B; also, shutoff valve 455 in FIG. 7). The shutoff valve 655 may be configured to allow gas to flow through the shutoff valve 655 (and thus to a connected subsystem of the gas and vacuum system) when the handwheel 650 is in the open position 651 illustrated in FIGS. 6A and 8A. However, when the handwheel 650 is rotated to a closed position (such as closed position 452 illustrated in FIG. 9C, where the handwheel 450 has been rotated 90 degrees or more from the open position 451 illustrated in FIG. 9A) the shutoff valve 655 is closed to prevent, stop, or cut off the flow of gas through the shutoff valve 655. FIG. 9B illustrates an intermediate position 451A of the handwheel 450, where the handwheel 450 is located between the open position 451 (see FIG. 9A) and the closed position 452 (see FIG. 9C) and is in the process of being rotated from the open position 451 to the closed position 452.

As illustrated in FIGS. 6A, 8A, and 8B, located behind the access panel 600, which has been removed in those figures to facilitate the description, and aligned with the auxiliary openings (see openings 440 and 441 in FIG. 5) is a pair of auxiliary connections 602 and 604. These auxiliary connections 602 and 604 may be non-interchangeable screw-threaded (hereinafter "NIST") connectors that may enable an operator to attach auxiliary lines for an apparatus or device that may require the gas/vacuum provided by the components behind the access panel 600. The NIST connectors 602 and 604, and their functionality/purpose, are described in more detail below, particularly, with respect to the NIST connector 602 shown in FIGS. 13A-13E.

As illustrated in FIG. 8B, disposed proximate to the shutoff valve 655 and behind the cover plate, as further detailed below, may be one or more maintenance connections 656 and 658. These maintenance connections 656 and 658 may be equipped with a pressure sensor/switch 659A (see FIG. 8B) that enables an operator of the AVSU 10 to maintain both the AVSU 10 and/or the particular subsystem of the gas and vacuum system associated with the components of that particular access panel 600.

A cover plate 660 (in FIG. 6A) may be disposed between the handwheel 650 and the shutoff valve 655. The cover plate 460 illustrated in FIGS. 6B and 10A-10C has the same structure as cover plate 660. Cover plate 660 may be coupled to a bracket 659 (the brackets 459 and 659 being shown in FIGS. 7, 8A, and 8B without the respective cover plate 460 or 660 attached) that positions the cover plate 660 between the handwheel 650 and the shutoff valve 655. As shown in FIG. 6A, the cover plate 660 may have at least one central opening 662 that encircles the connection between the handwheel 650 and the shutoff valve 655. The illustrated embodiment of the cover plate 660 may also have two vertical slots 663 and 664 that are disposed on either side of the central opening 662 of the cover plate 660. The cover plate 660 may be disposed behind the access panel 600 such that at least a portion of the cover plate 660 is visible through the central opening of the access panel 600 and the access panel door. As shown in at least FIG. 6A, the cover plate 660 may contain indicia 666 that indicates the direction of flow through the shutoff valve 655, indicia 667 that indicates the direction of rotation of the handwheel 650 in order to close the shutoff valve 655 (see the operation in FIGS. 9A-9C), and indicia 668 and 669, respectively, that indicates which auxiliary connector is a downstream auxiliary connector and which is an upstream auxiliary connector. The cover plate 660 may contain any other indicia that may be beneficial to an operator of the AVSU 10.

Figure 10C:
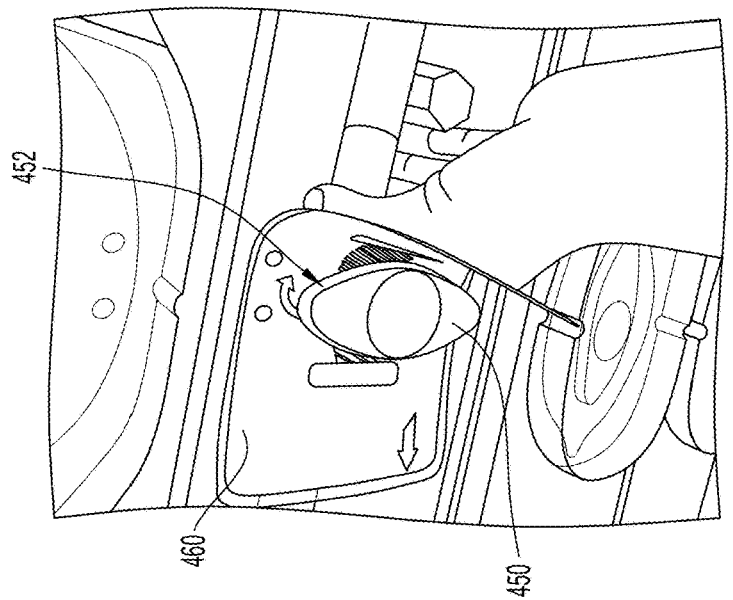
FIG. 10A-10C illustrate perspective views of a cover plate being bent to provide access to the components located behind the cover plate.
Figure 10B:
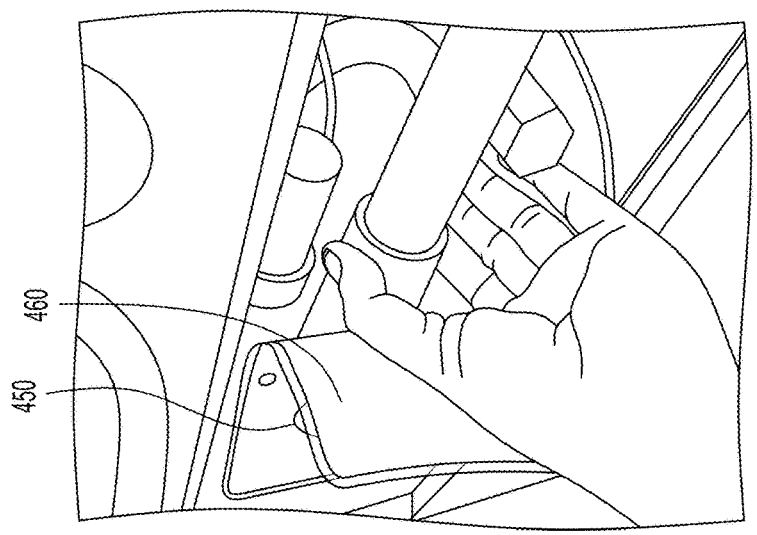
Figure 10A:
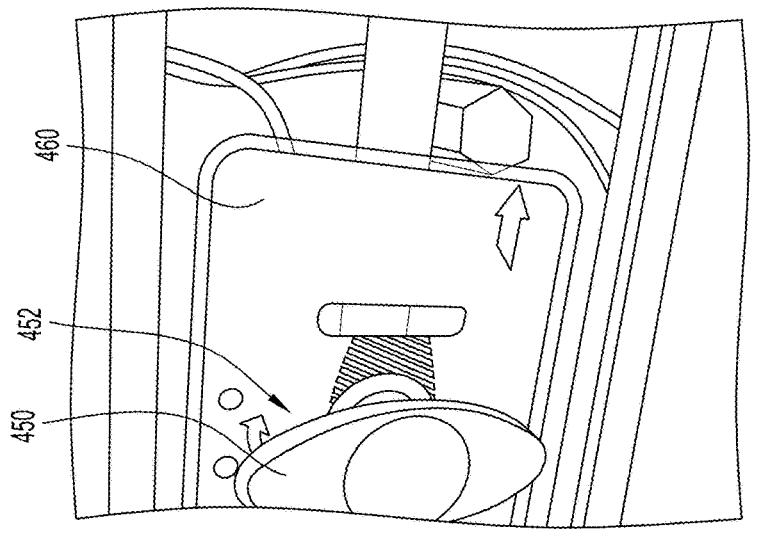

As best illustrated in FIGS. 10A-10C, the cover plate 460 may be flexible such that it may be bent by an operator when the access panel 400 is in the opened position, and after the handwheel 450 has been rotated to its closed position 452. While flexible, the cover plate 460 may still contain a degree of rigidity and resiliency such that, when an operator releases the cover plate 460 from being flexed or bent, the cover plate 460 returns to its planar orientation, like cover plate 660 illustrated in FIG. 6A. Thus, the cover plate 460 may be constructed from suitable materials that include, but not limited to, polyamide. The flexibility of the cover plate 460 more easily permits maintenance of the AVSU system 10. For example, regularly scheduled leak testing may be required, and may require the fitting of components to the maintenance connections (see 656 and 658 in FIG. 8B) located behind the cover plate 460 to block the flow of gas flow. With conventional systems, these maintenance connections are typically accessed by removing both the handwheel 450 and the cover plate 460. However, with the design described herein, the flexible cover plate 460 allows access to the maintenance connections without having to remove the handwheel 450 or the cover plate 460 (i.e., the handwheel 450 may be rotated 90 degrees to a vertical position (the closed position 452 shown in FIGS. 9C and 10A-10C), and the cover plate 460 may be bent out of the way (as shown in FIGS. 10B and 10C)). The flexible nature of the cover plate 460 also allows for easier access to the pressure sensor/switch (see 659A in FIG. 8B) which may also be located behind the cover plate 460 and may be required to be tested regularly.

Figure 11A:
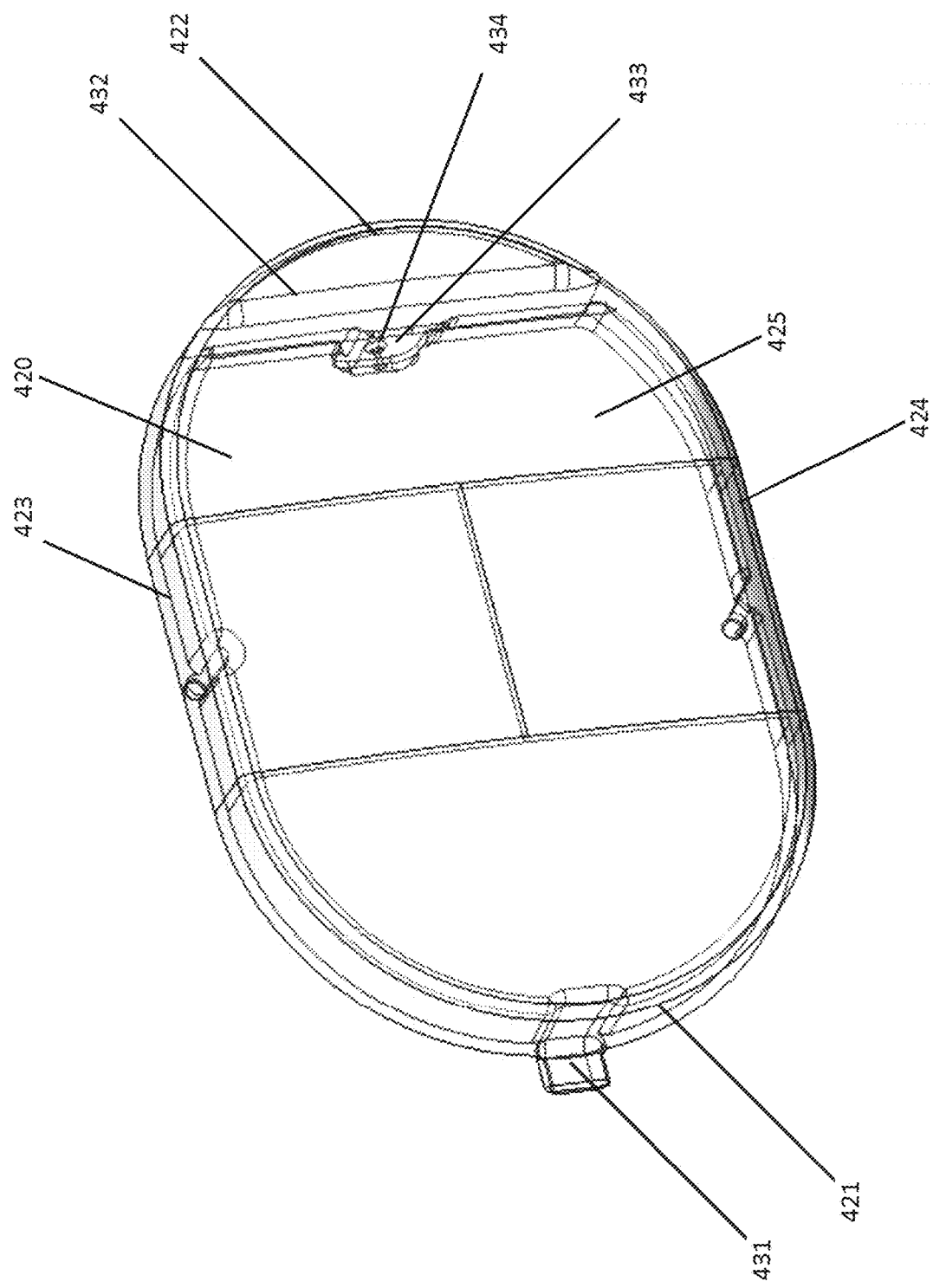
FIG. 11A illustrates a front perspective view of a door of the access panel illustrated in FIG. 5.
Figure 11B:
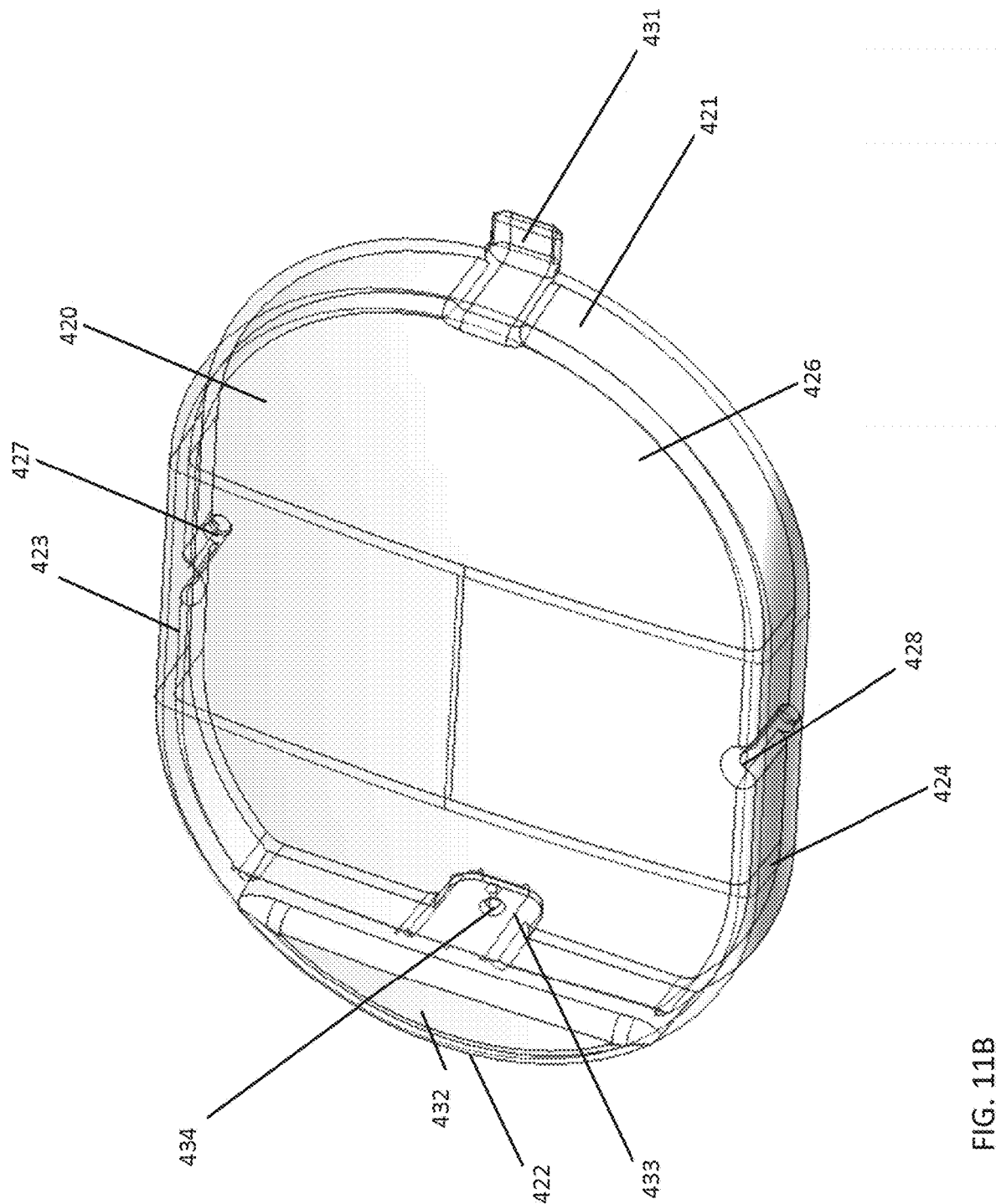
FIG. 11B illustrates a rear perspective view of the door illustrated in FIG. 11A.

Turning to FIGS. 11A and 11B, illustrated are isolated front and rear views of the access panel door 420. As previously explained, the access panel door 420 is attached to the access panel 400 such that the door 420 is disposed over the central opening 415 of the access panel 400. In addition, the door 420 may be transparent or translucent such that objects may be visible through the door 420. The door 420 may be substantially stadium shaped (e.g., discorectangle, obround, etc.) with a first rounded end 421 and an opposite second rounded end 422. The door 420 includes a top side 423 spanning from the first rounded end 421 to the second rounded end 422, and an opposite bottom side 424 that also spans from the first rounded end 421 to the second rounded end 422. As further illustrated, the door contains an outer surface 425 and an inner surface 426 opposite the outer surface 425. As illustrated, the door 420 includes a first extending member 431 that extends from the first rounded end 421 of the door 420, and a handle or engagement portion 432 disposed at the second rounded end 422 of the door 420. The engagement portion 432 may be shaped such that, when the door 420 is in the closed position, the engagement portion 432 is spaced from the outer surface of the access panel 400. Thus, when the door 400 is in the closed position, the engagement portion 432 may be grasped by an operator.

As illustrated in FIG. 11B, the door 420 also includes a securement member 433 that is disposed proximate to the engagement portion 432, and more proximate to the second rounded end 422 than the first rounded end 421. The securement member 433 may extend rearward from the inner surface of the door 420. As also illustrated in FIG. 11B, the door 420 contains two projections 427 and 428 that also extend rearward from the inner surface 426 of the door 420. The first projection 427 may be disposed centrally along the top side 423 of the door 420, while the second projection 428 may be disposed centrally along the bottom side 424 of the door 420. Thus, the first projection 427 and the second projection 428 may be vertically aligned with one another.

When the door 420 is in the closed position, the projections 427 and 428 of the door 420 extend into the two apertures 417 and 418, respectively, of the access panel 400 that are disposed above and below the central opening 415 of the access panel 400. Thus, the first projection 427 disposed on the top side 423 of the door 420 may extend into the first aperture 417 disposed above the central opening 415 of the access panel 400, while the second projection 428 disposed on the bottom side 424 of the door 420 may extend into the second aperture 418 disposed below the central opening 415 of the access panel 400. In some embodiments, the projections 427 and 428 may serve to at least partially secure the door 420 in the closed position via a friction fit, interference fit, or other suitable securing means.

Returning briefly to FIG. 7, when the door 420 is in the closed position such that the door 420 covers the central opening 415 of the access panel 400, the securement member 433 is aligned with, and disposed adjacent to, or in abutment with, a securement flange 413A extending rearward from the inner side 407 of the access panel 400 proximate to the central opening 415 of the access panel 400. The securement member 433 includes an aperture 434 (see FIGS. 11A and 11B) and the securement flange 413A includes an aperture 413B. The apertures 434 and 413B of the securement member 433 and the securement flange 413A, respectively, are aligned when the door 420 is in the closed position.

Figure 11F:
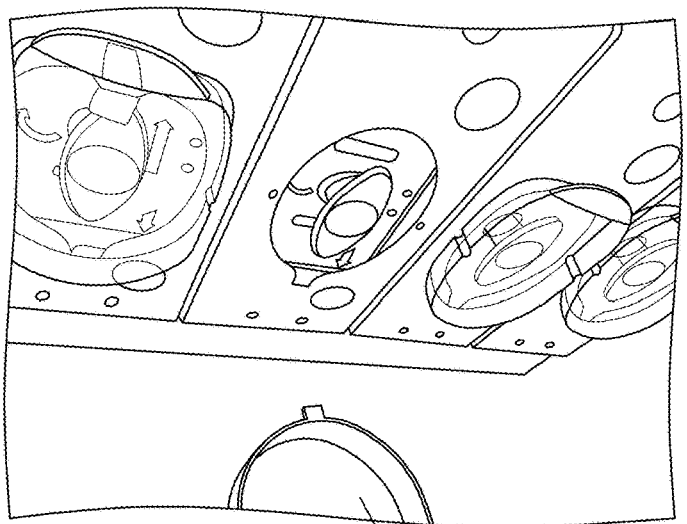
FIGS. 11D-11F illustrates perspective views of an access panel door being rotated to an open position and removed from an AVSU.
Figure 11E:
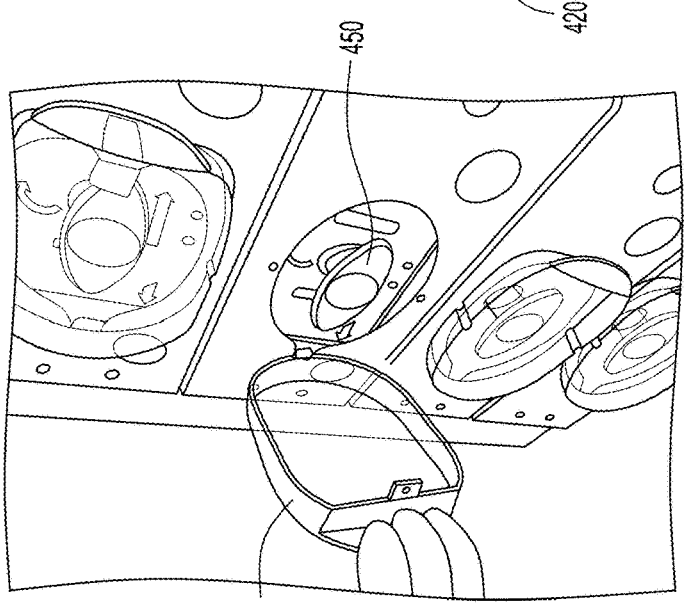
Figure 11D:
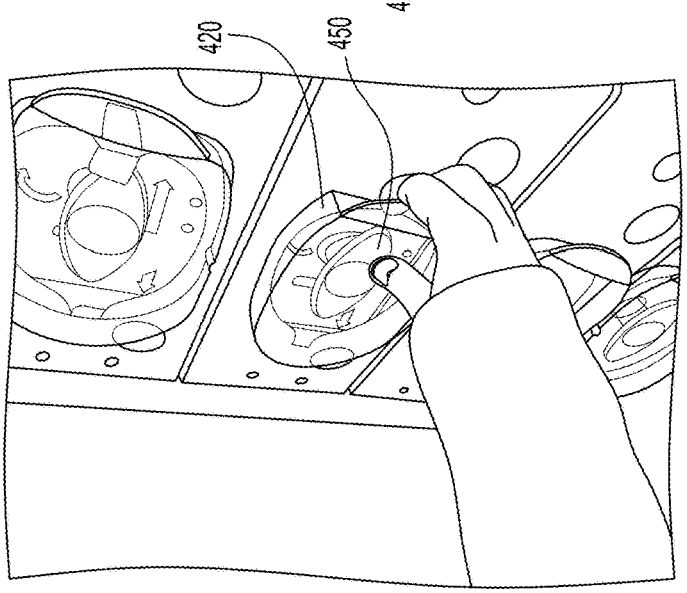

As best illustrated in FIG. 11C, each access panel door, such as door 320, door 420 or door 520, when in its closed position, is secured in the closed position by a securement tab or tether 435 (also referred to as a securement member or connector member) that is threaded through both the aperture 434 of the securement member 433 of the access panel door 420 and the aperture 413B of the securement flange 413A of the access panel 400. The securement tab 435 may be constructed from a material that secures the door 420 in the closed position, but is capable of breaking when enough force is applied to the door 420 to cause the door 420 to rotate to the open position and removed (see FIGS. 11D-11F). The securement tab 435 may be constructed from materials that may provide resistance to prevent misuse of the door 420, but not enough resistance to prevent the door 420 from being pulled opened when needed/desired. In other words, when an operator purposefully pulls on the door 420, preferably via engagement with the engagement portion 432, and provides enough force, the securement tab 435 may break or rip such that it is no longer disposed within both the aperture 434 of the securement member 433 of the door 420 and the aperture 413B of the securement flange 413A of the access panel 400. The breaking or tearing of the securement tab 435 under force/pressure provides an operator with access to the handwheel 450 without having to unlock the access panel 400 and rotate the access panel 400 to the open position. This feature is particularly useful in an emergency when the gas or vacuum of a particular subsystem is required to be shut off immediately. Thus, any operator, whether or not that operator has access to the key for the lock of the access panel 400, may shut off the gas or vacuum in an emergency by pulling the door 420 open with enough force to break/tear the securement tab 435 and then rotating the handwheel 450 for the shutoff valve 455 to the closed position (as shown in FIGS. 9A-9C). The arrangement of the door 420 and access panel 400 described herein further allows operators to quickly visualize which doors have been opened, and which handwheels have been accessed without the access panel being unlocked (i.e., through a missing or broken securement tab). Moreover, by the door 420 being constructed from plastic materials including, but not limited to, polymethyl methacrylate, the doors may be reused after being pulled open for an emergency use. Conventional AVSU's may be equipped with doors or panels that are not reusable after being used during an emergency event (e.g., breakable glass, etc.).

Figure 12A:
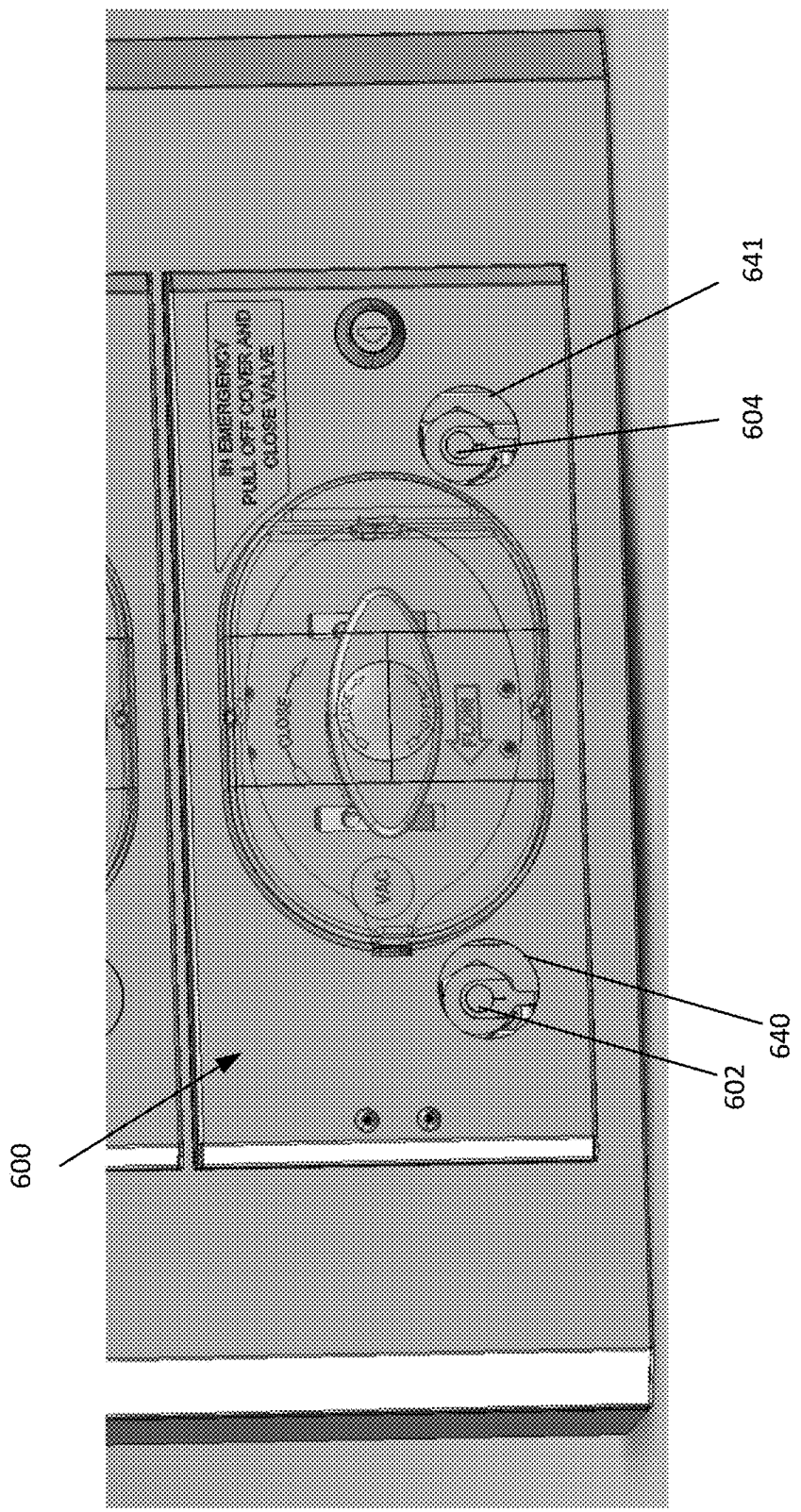
FIG. 12A illustrates a front view of an access panel with non-interchangeable screw-threaded (hereinafter "NIST") connector access plates being removed from the access panel.
Figure 12B:
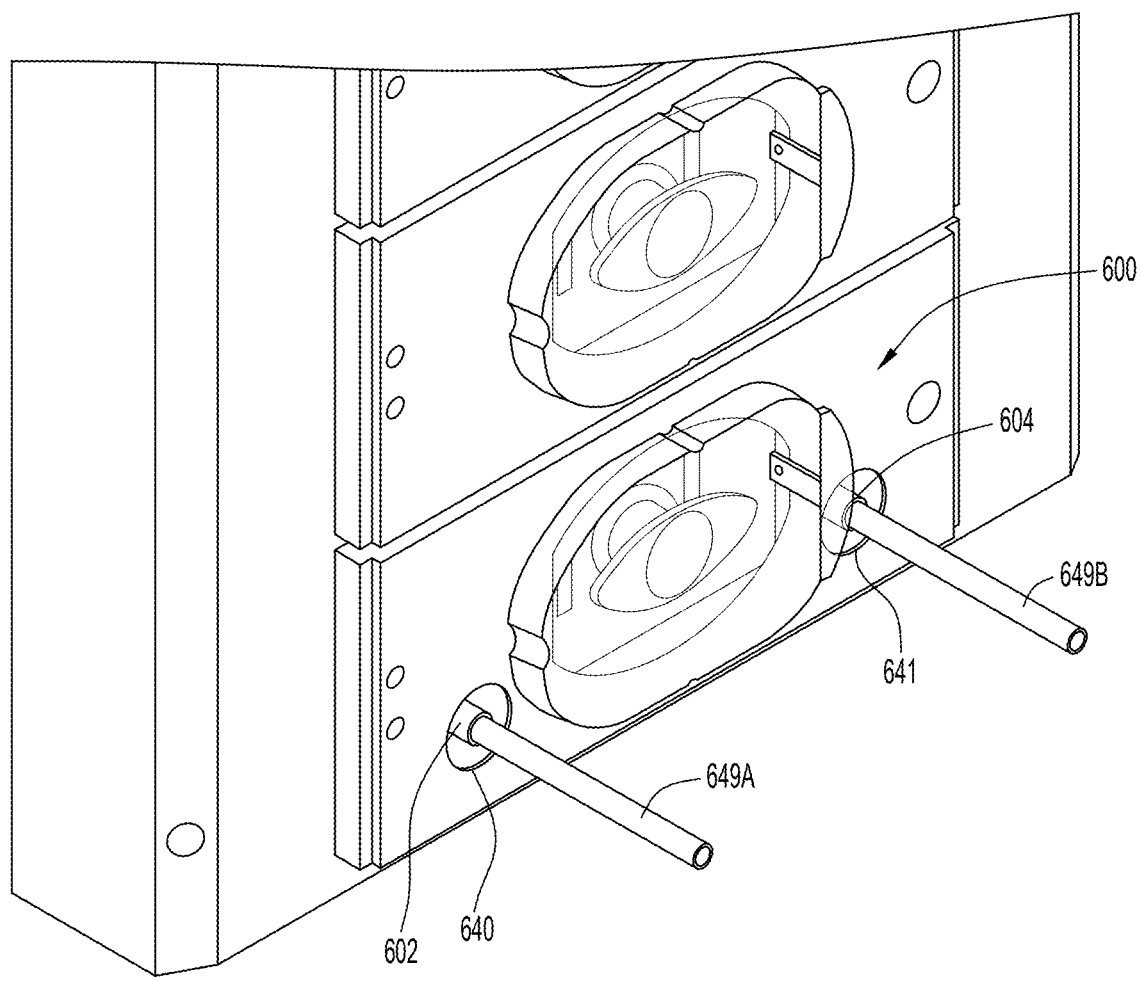
FIG. 12B illustrates a perspective view of external gas lines connected to the NIST connectors through the access openings in the access panel.

As explained previously, each one of the access panels 100, 200, 300, 400, 500, and 600 of the AVSU 10 may be equipped with two auxiliary openings that have been previously shown with plates disposed within the auxiliary openings. Referring to FIG. 12A, access panel 600 is illustrated and is representative of the other access panels 100, 200, 300, 400, and 500. Moreover, as illustrated in FIGS. 12A and 12B, the auxiliary connectors 602 and 604 may be disposed behind the access panel 600 such that the auxiliary connectors 602 and 604 are aligned with the auxiliary openings 640 and 641 in the access panel 600. The access panel 600 disclosed herein may facilitate the use of the auxiliary connectors 602 and 604 while the access panel 600 is still in its closed and locked position (as illustrated in FIG. 12B). As previously explained and illustrated in FIG. 7, the auxiliary openings are typically closed/sealed by plates disposed within/covering the auxiliary openings, where the plates of the auxiliary openings are secured to the inner side of the access panel by sliding the plates along the posts disposed on the inner side of the access panel (i.e., such that the posts are inserted through the apertures on the two projections that extend outward from the edges of the plates). With the posts being located on the inner side of the access panel, when use of the auxiliary openings is desired, the access panel must be unlocked and rotated to the opened position (as shown in FIG. 6B). With the access panel in the opened position, the plates may then be slid away from the inner side of the access panel in order to open the auxiliary openings. With the plates removed from the auxiliary openings of the access panel, the access panel may be closed and locked. As illustrated in FIGS. 12A and 12B, with the plates removed, the auxiliary connectors 602 and 604 may be visible and accessible through the auxiliary openings 640 and 641, respectively, and gas/vacuum lines 649A and 649B may be hooked up/connected to the auxiliary connectors 602 and 604 while the access panel 600 remains closed and locked. Other conventional AVSU systems require the access panel door to be open when auxiliary connectors are being used, which creates safety issues.

Figure 13A:
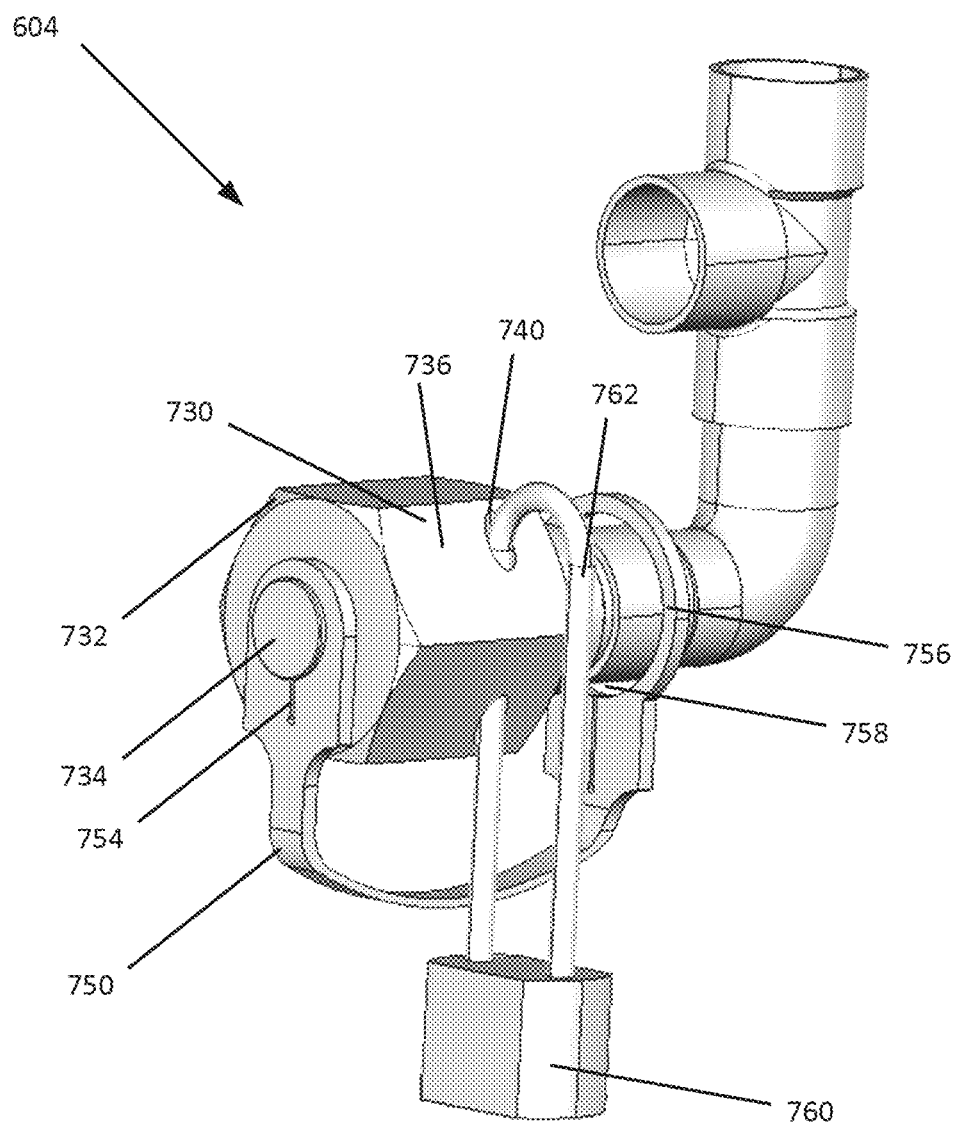
FIG. 13A illustrates a perspective view of a NIST connector of an AVSU.
Figure 13B:
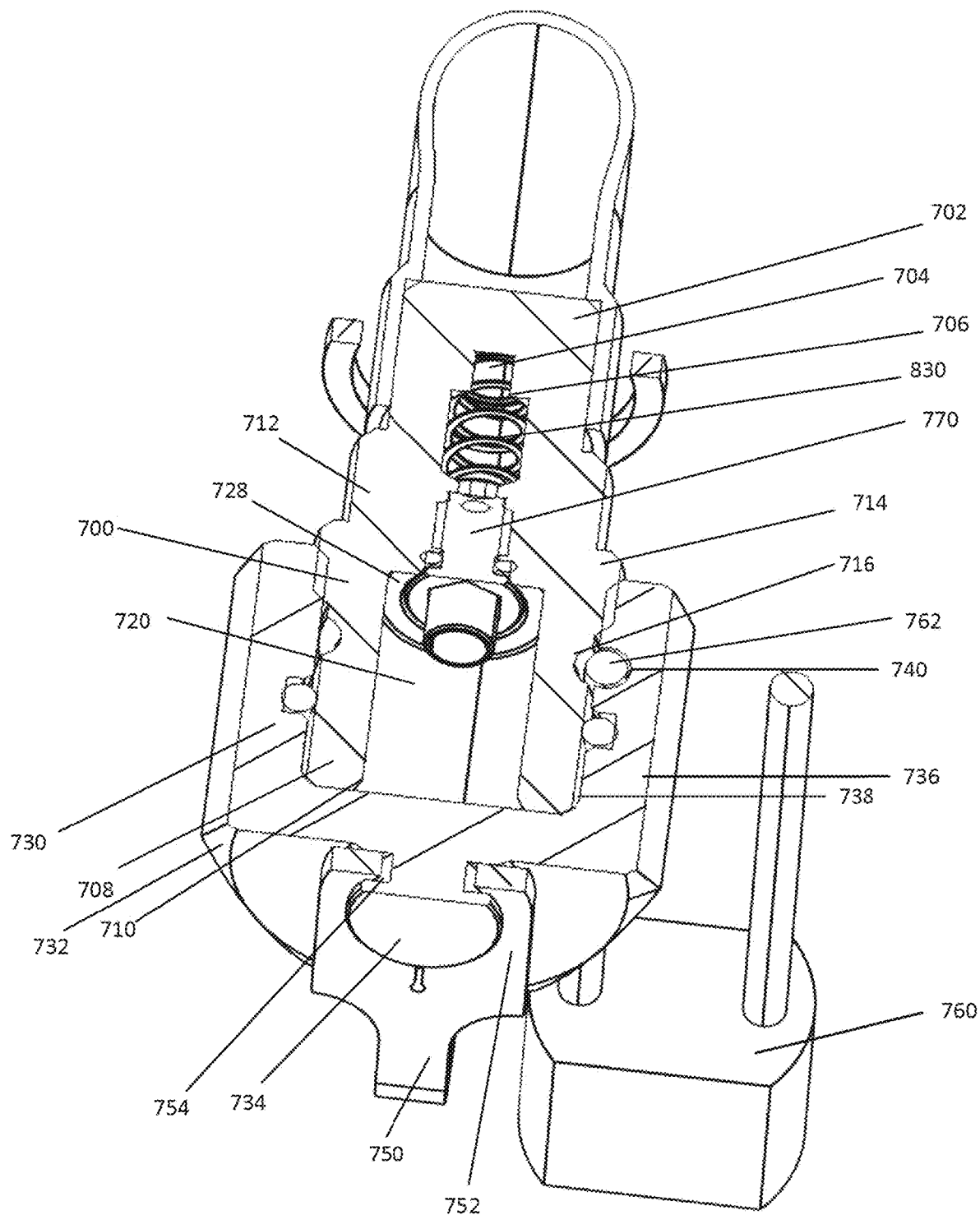
FIG. 13B illustrates a top cross-sectional view of the NIST connector illustrated in FIG. 13A.
Figure 13C:
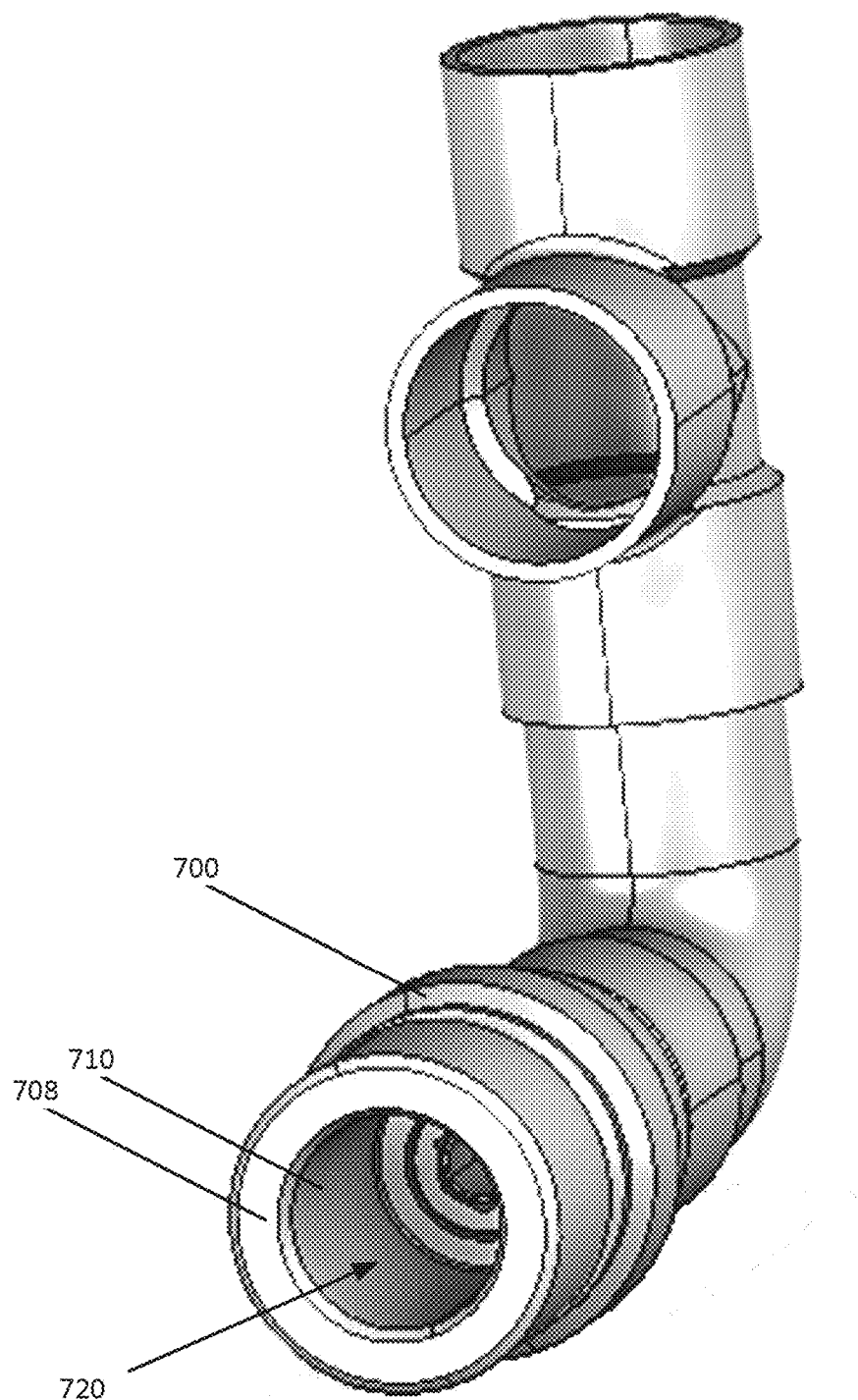
FIG. 13C illustrates a perspective view of the NIST connector illustrated in FIG. 13A with the endcap removed.

Turning to FIGS. 13A-13E, illustrated are views of an auxiliary connector 604. The following description of auxiliary connector 604 applies to the other auxiliary connectors in the AVSU system. As previously explained, the auxiliary connectors may be NIST connectors. As illustrated, each NIST connector 604 includes a main connector 700, a connector cover or cap 730, and a check valve 770. As shown in FIG. 13B, the main connector 700 may include a first end 702, an opposite second end 708, and a sidewall 712 spanning from the first end 702 to the second end 708. The main connector 700 may further include a conduit 720 running through the connector 700 from the first end 702 to the second end 708, where the first end 702 may define an outlet 704 and the second end 708 may define an inlet 710. The inlet 710 may be larger in diameter than the outlet 704. Disposed within the conduit 720 or formed in the conduit walls 722, 724 and 726 between the inlet 710 and the outlet 704 may be a flange 728, while formed around the outlet 704 may be an end wall 706. Said another way, the outlet 704 may be disposed within an end wall 706 disposed at the first end 702 of the main connector 700. As illustrated in FIGS. 13A-13C, the sidewall 712 of the main connector 700 may contain a projection 714 extending radially outward, where the projection 714 is disposed between the first end 702 and the second end 708 of the main connector 700. The sidewall 712 of the main connector 700 may also contain a channel 716 extending around the main connector 700, the channel 716 being located between the radial projection 714 and the second end 708 of the connector 700.

As illustrated in FIGS. 13A and 13B, a cap 730 may be disposed over the second end 708 of the main connector 700. The cap 730 may include an end face 732 and an annular sidewall 736 that collectively define a cavity 738. When the cap 730 is disposed over the second end 708 of the main connector 700, the cavity 738 of the cap 730 receives the second end 708 of the main connector 700. Thus, the cap 730 is configured to slide over the second end 708 of the main connector 700 such that the second end 708 of the main connector 700 is inserted into the cavity 738 of the cap 730. The sidewall 736 of the cap 730 may include a thru-channel 740 that is offset from a central axis of the cap 730. When covering the second end 708 of the main connector 700 with the cap 730, the cap 730 may be slid over the second end 708 of the main connector 700 until the sidewall 736 abuts the radial projection 714 of the main connector 700 (see FIG. 13B). In this position, the thru-channel 740 of the cap 730 may be aligned with the channel 716 in the sidewall 712 of the main connector 700.

As illustrated in FIGS. 13A and 13B, an arm 762 of a lock 760 may be inserted through the thru-channel 740 of the cap 730 such that the arm 762 is disposed both in the channel 716 of the sidewall 712 of the main connector 700, and in the thru-channel 740 of the cap 730. Insertion of the lock arm 762 in both of these channels 716 and 740 prevents the cap 730 from being removed from the second end 708 of the main connector 700 until the lock arm 762 has been removed from at least the channel 716 of the sidewall 712 of the main connector 700.

As further illustrated in FIGS. 13A and 13B, the cap 730 may be further equipped with a tether 750 that is secured at one end 752 to a connector 734 on the end face 732 of the cap 730 by inserting connector 734 into opening 754. The opposing end 756 of the tether 750 may be secured around the main connector 700 proximate to the first end 702 of the main connector 700 via opening 758. Thus, when the cap 730 is removed from covering the second end 708 of the main connector 700, the cap 730 may hang from the main connector 700 via the tether 750, and may be readily accessible when the cap 730 needs to be placed back onto the second end 708 of the main connector 700.

Figure 13D:
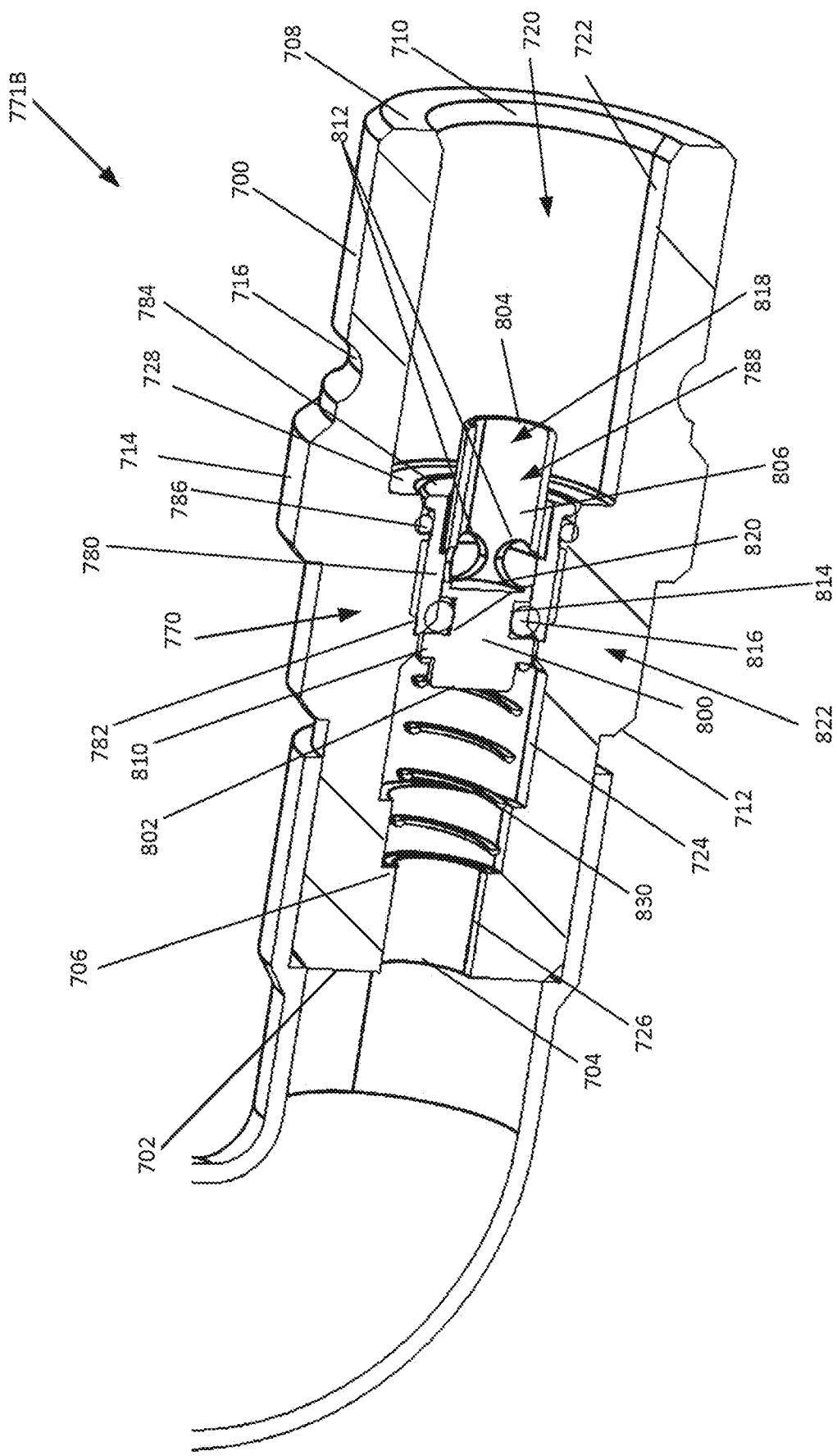
FIG. 13D illustrates a side cross-sectional view of the NIST connector illustrated in FIG. 13A with a check valve in a closed position.
Figure 13E:
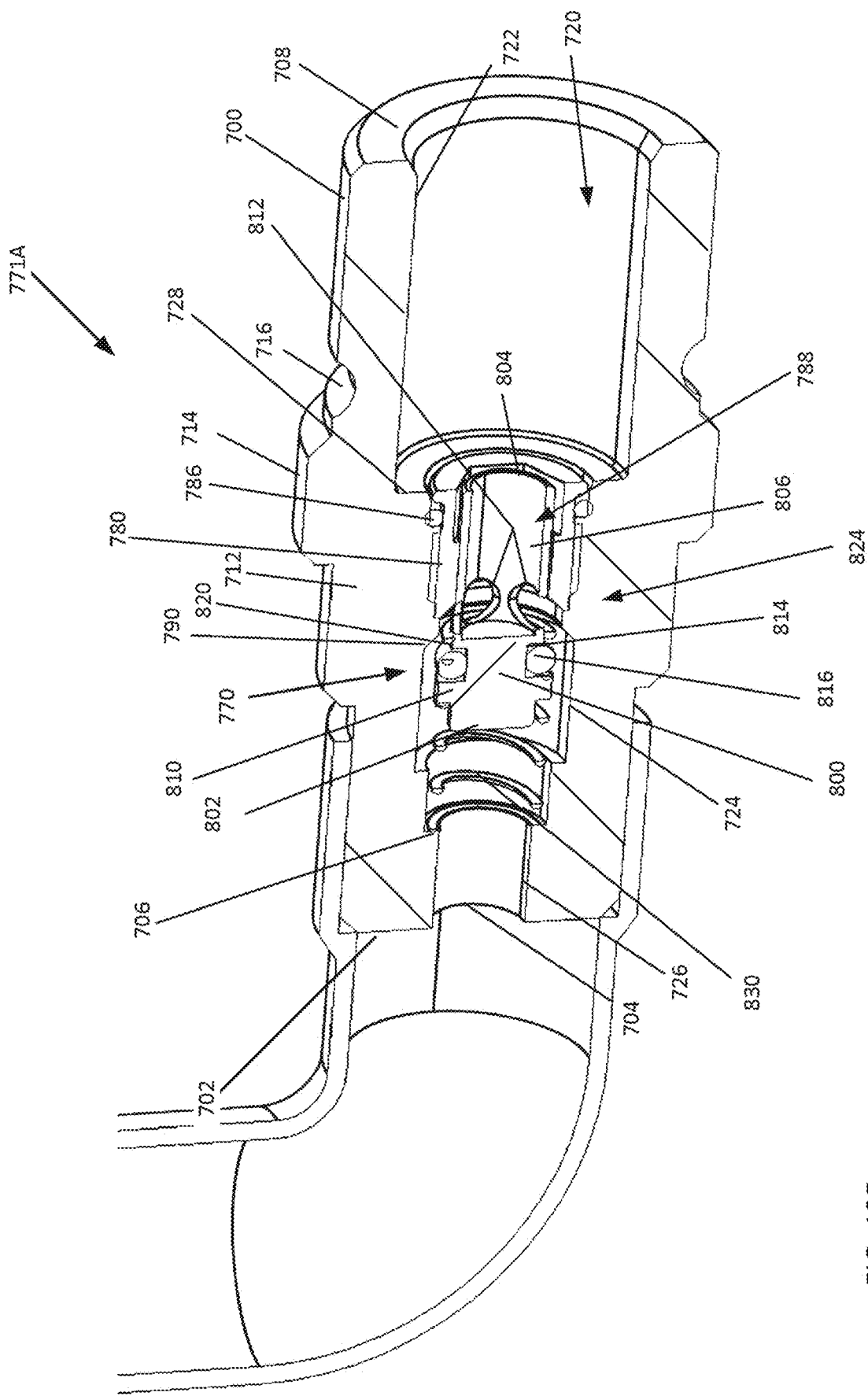
FIG. 13E illustrates a side cross-sectional view of the NIST connector illustrated in FIG. 13A with the check valve in an opened position.

As best illustrated in FIGS. 13B, 13D and 13E, disposed within the conduit 720 and interconnected with the flange 728 is a check valve 770 which has an opened position 771A (see FIG. 13E) and a closed position 771B (see FIG. 13D). The check valve 770 includes an outermost portion 780, a sliding cylindrical portion 800 disposed centrally within the outermost portion 780, and a resilient member 830. The outermost portion 780 of the check valve 770 may be coupled to the flange 728 of the conduit 720 of the main connector 700. A gasket or other seal 786 may be disposed around the outermost portion 780, and between the outermost portion 780 and the flange 728 to form a seal between the outermost portion 780 and the flange 728. The outermost portion 780 of the check valve 770 may include a central conduit 788 that extends centrally through the outermost portion 780 from the first end 782 of the outermost portion 780 to the second end 784 of the outermost portion 780.

The sliding cylindrical portion 800 may be slidably disposed within the central conduit 788 of the outermost portion 780, and may include a first end 802, a second end 804, and a sidewall 806 extending between the first end 802 and the second end 804. The sliding cylindrical portion 800 may further include an outcropping 810 that radially extends outward from the sidewall 806 proximate to the first end 802. The sidewall 806 of the sliding cylindrical portion 800 may also include a channel 814 disposed proximate to the outcropping 810, but located between the outcropping 810 and the second end 804. In other words, the outcropping 810 may extend radially from the sidewall 806 at a location disposed between the channel 814 and the first end 802 of the sliding cylindrical portion 800. A gasket or seal 816 may be disposed within the channel 814. As further illustrated, a conduit 818 may extend into the sliding cylindrical portion 800 from the second end 804 of the sliding cylindrical portion 800, where the conduit 818 terminates at a location that is disposed between the first end 802 and the second end 804. In other words, the conduit 818 extends into the sliding cylindrical portion 800 at the second end 804 and terminates prior to the first end 802 of the sliding cylindrical portion 800. Disposed in the sidewall 806 between the first end 802 and the second end 804 of the sliding cylindrical portion 800 may be a series of apertures 812. The series of apertures 812 may be located proximate to both the terminating end 820 of the conduit 818 and the channel 814 in the sidewall 806 of the sliding cylindrical portion 800. Thus, the series of apertures 812 may be disposed between the channel 814 and the second end 804 of the sliding cylindrical portion 800. As further illustrated, the series of apertures 812 may be in fluid communication with the conduit 818.

The resilient member 830 may be in abutment with the end wall 706 of the main connector 700 and the outcropping 810 of the sliding cylindrical portion 800. The resilient member 830 may bias the sliding cylindrical portion 800 to a closed position 822 (FIG. 13D), where the gasket 816 disposed in the channel 814 of the sliding cylindrical portion 800 is in abutment with the central conduit walls 790 of the outermost portion 780, and the series of apertures 812 of the sliding cylindrical portion 800 are disposed within the central conduit 788 of the outermost portion 780. In this closed position 822, the second end 804 of the sliding cylindrical portion 800 extends beyond an end 784 of the outermost portion 780 and is disposed more proximate to the second end 708 of the main connector 700 than the outermost portion 780. However, when a hose or other type of fitting is coupled to the second end 708 of the main connector 700, the fitting contacts and pushes the second end 804 of the sliding cylindrical portion 800 toward the first end 702 of the main connector 700. In other words, as illustrated in FIG. 13E, when a fitting (not shown) is coupled to the main connector 700, the fitting causes the sliding cylindrical portion 800 to push against the biasing force of the resilient member 830, and slides the sliding cylindrical portion 800 until the second end 804 of the sliding cylindrical portion 800 is at least aligned with the second end 784 of the outermost portion 780 of the check valve 770 (i.e., the second end 804 of the sliding cylindrical portion 800 is not disposed more proximate to the second end 708 of the main connector 700 than the outermost portion 780). In this open position 824 illustrated in FIG. 13E, the gasket 816 disposed within the channel 814 of the sliding cylindrical portion 800 is no longer in abutment with the central conduit walls 790 of the outermost portion 780, and the series of apertures 812 in the sidewall 806 of the sliding cylindrical portion 800 are no longer disposed entirely within the central conduit 788 of the outermost portion 780. Thus, in the opened position 824, fluid is free to flow into the inlet 710 at the second end 708 of the main connector 700, into the conduit 818 of the sliding cylindrical portion 800, through the series of apertures 812 of the sliding cylindrical portion 800, through the outermost portion 780 of the check valve 770, around the first end 802 of the sliding cylindrical portion 800, and out the outlet 704 disposed on the first end 702 of the main connector 700. Once the fitting is removed from the second end 708 of the main connector 700, the resilient member 830 biases the sliding cylindrical portion 800 back to the closed position 822 shown in FIG. 13D, where the gasket 816 disposed within the channel 814 of the sliding cylindrical portion 800 is in abutment with the central conduit walls 790 of the outermost portion 780, and where the series of apertures 812 of the sliding cylindrical portion 800 are disposed entirely within the central conduit 788 of the outermost portion 780 of the check valve 770.

Figure 14A:
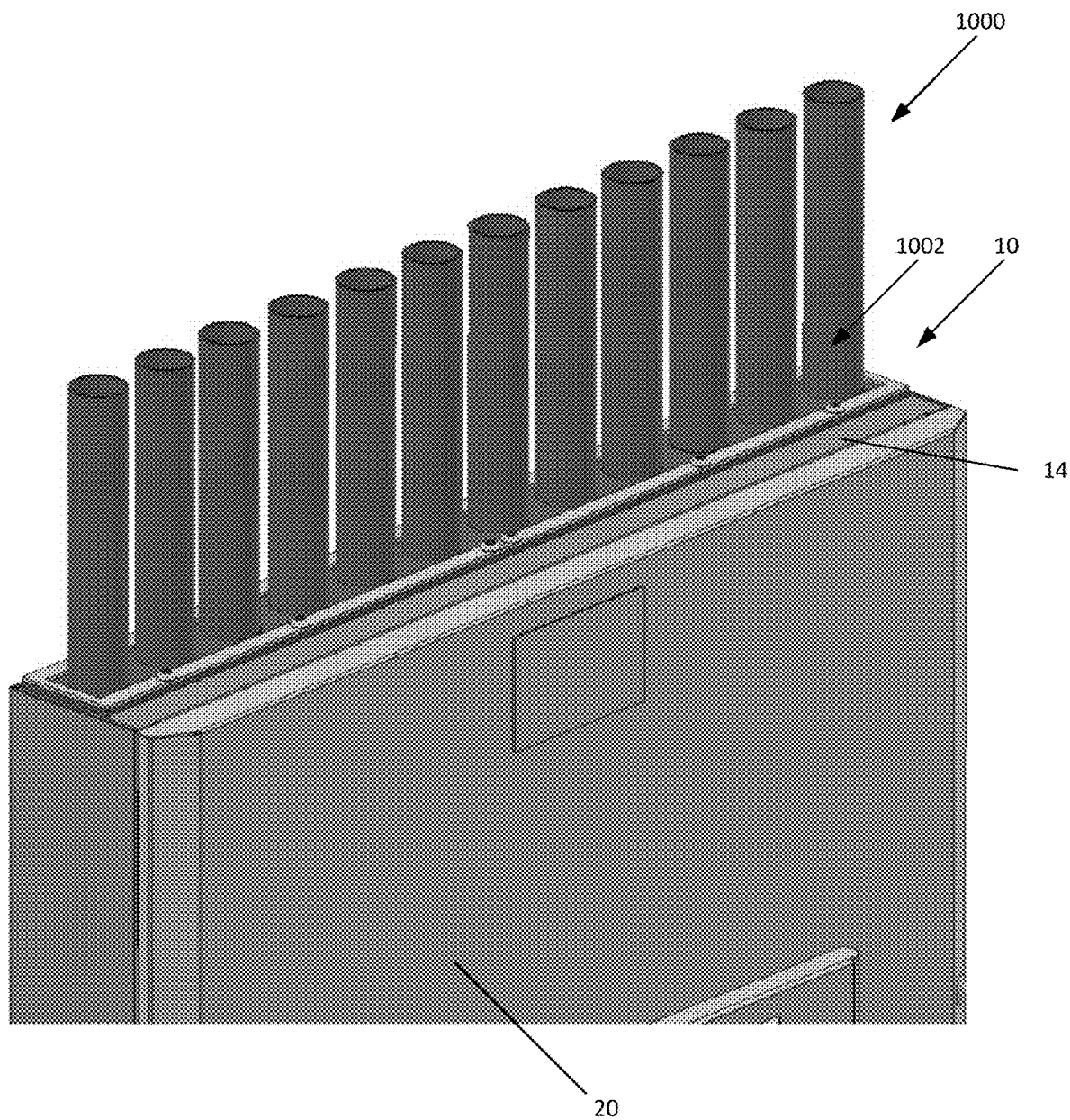
FIG. 14A illustrates a perspective view of the top end of the AVSU illustrated in FIG. 1 and the gasket disposed on the top end of the AVSU.
Figure 14B:
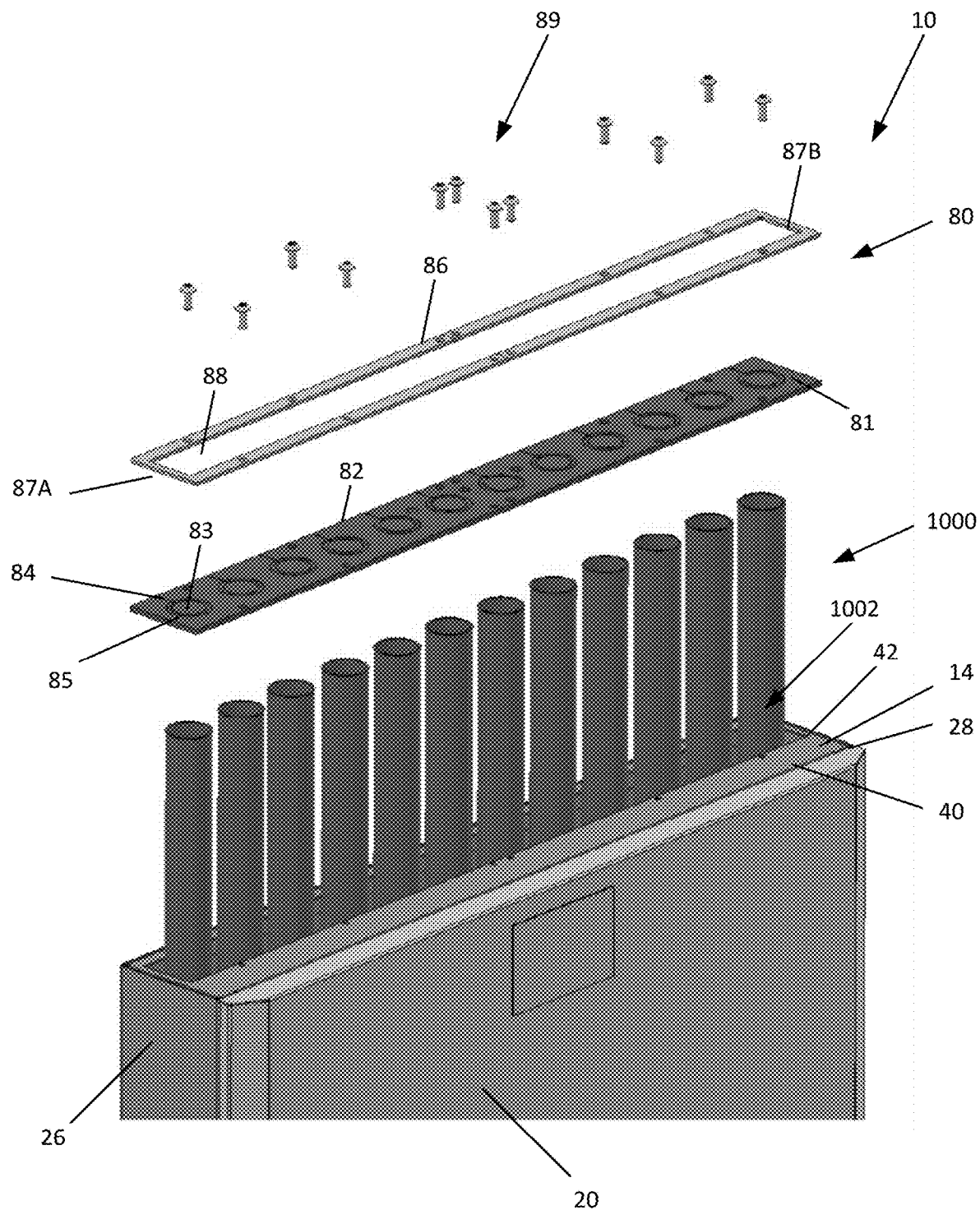
FIG. 14B illustrates an exploded perspective view of the top end of the AVSU illustrated in FIG. 14A.

Turning to FIGS. 14A and 14B, illustrated is the sealing apparatus 80 that is configured to seal the top end 14 of the cabinet 20 of the AVSU 10, both from leaks into and out of the cabinet 20 of the AVSU 10. As illustrated in FIG. 14B, the top end frame member 40 of the cabinet 20 of the AVSU 10 may include an elongated opening 42 that spans from one sidewall 26 of the cabinet 20 to the opposing sidewall 28 of the cabinet 20. The pipes 1000 may extend into and out of the interior volume of the cabinet 20 through the elongated opening 42 of the top end frame member 40.

In this embodiment, the sealing apparatus 80 may include a substantially planar gasket or seal 81 that is disposed over the elongated opening 42 of the top end frame member 40 of the cabinet 20, and disposed around each of the pipes 1000. The gasket 81 has an elongate edge 82 and includes a series of circular opening 83 and a series of slits 84. Each slit 84 may extend from a circular opening 83 toward the elongated edge 82 of the gasket 81. The circular openings 83 may be sized to receive and encircle one of the pipes 1000 such that the gasket 81 remains in contact with the sidewalls 1002 of the pipes 1000 in order to form a seal around the pipes 1000 (i.e., the edges 85 of the gasket 81 defining the circular openings 83 may remain in abutment with the sidewalls 1002 of the pipes 1000). In addition, the circular openings 83 may be spaced along the gasket 81 such that each circular opening 83 aligns with one of the pipes 1000.

The sealing apparatus 80 may further include a clamping bracket 86. The clamping bracket 86 has opposing ends 87A and 87B and may be substantially planar with an elongated opening 88 formed therein that spans from proximate end 87A to proximate opposing end 87B. The elongated opening 88 of the clamping bracket 86 may be sized and shaped similar to that of the elongated opening 42 of the top end frame member 40 of the cabinet 20. Thus, the plurality of pipes 1000 extending through the elongated opening 42 of the top end frame member 40 also extend through the elongated opening 88 of the clamping bracket 86 when coupled to the cabinet 20.

When the sealing apparatus 80 is coupled to the top end frame member 40, the gasket 81 is placed around the pipes 1000 (e.g., slid down the pipes 1000) such that each circular opening 83 receives a pipe 1000, and such that the gasket 81 covers the elongated opening 42 of the top end frame member 40. The clamping bracket 86 is then slid down the pipes 1000, such that the pipes 1000 pass through the elongated opening 88 of the clamping bracket 86, until the clamping bracket 86 is in abutment with and disposed over the gasket 81. A series of fasteners 89 may be utilized to secure the clamping bracket 86 to the top end frame member 40, and to clamp the gasket 81 between the top end frame member 40 and the clamping bracket 86.

Figure 17:
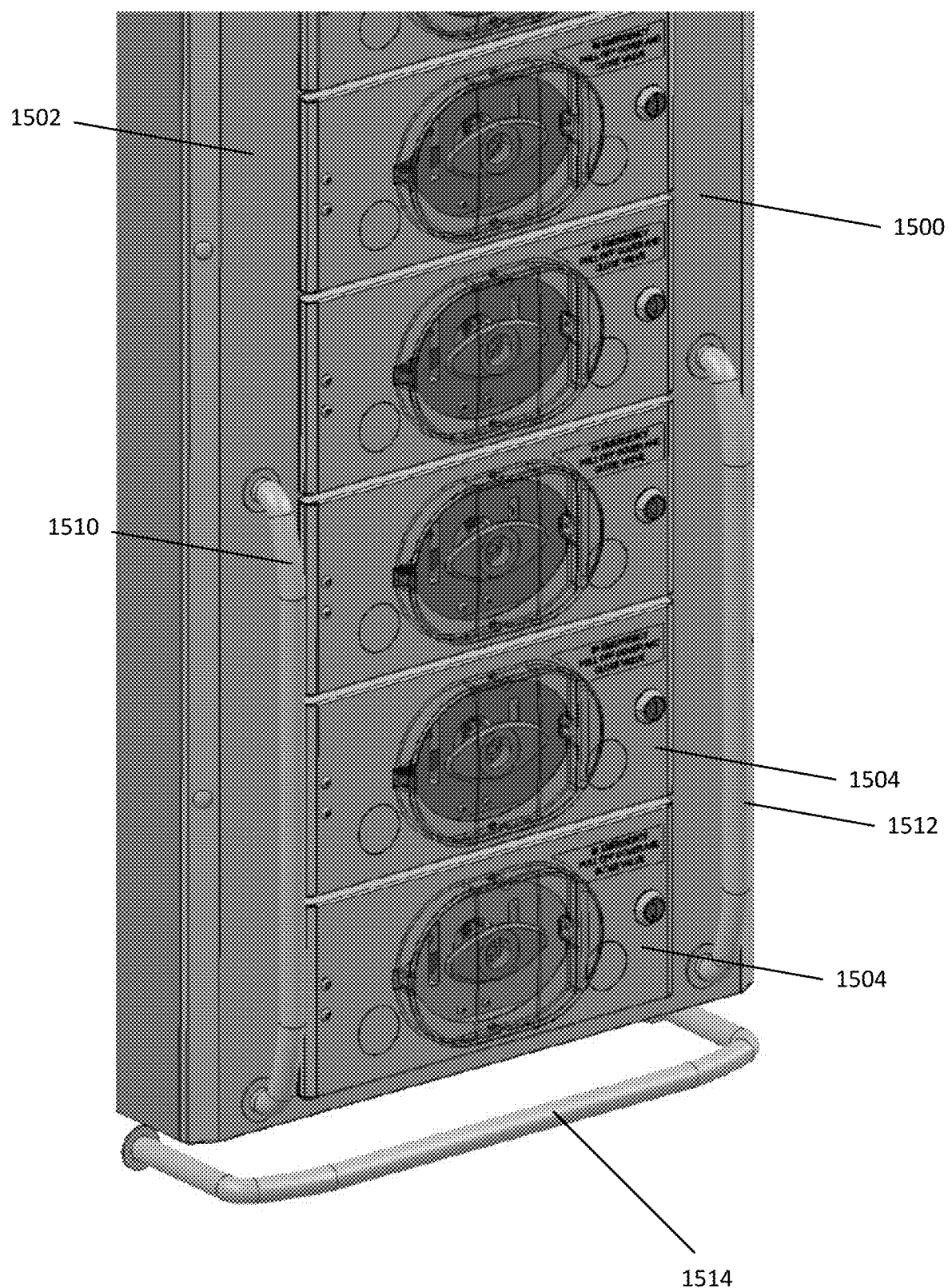
FIG. 17 illustrates a perspective view of another embodiment of an AVSU including bumper bars.

Turning to FIG. 17, illustrated is an embodiment of the AVSU cabinet 1500 equipped with bumper bars 1510, 1512, and 1514. These bumper bars 1510, 1512, and 1514 may serve to protect the AVSU cabinet 1500, and particularly the access panels 1504 located on the front surface 1502 of the AVSU cabinet 1500 as well as associated components from impacts by carts, hospital beds, and other structures that may be rolled into and/or contact the AVSU cabinet 1500. As illustrated, some of the bumper bars 1510 and 1512 may be coupled to the front surface 1502 of the AVSU cabinet 1500 in a vertical orientation, and on opposing sides of the access panels 1504. Bar 1514 is an exemplary horizontal bar. In other embodiments, the bumper bars may be oriented on the AVSU cabinet 1500 such that they are horizontal or may be oriented at an angle such that the bumper bars are offset from being horizontal and/or vertical.

Figure 18:
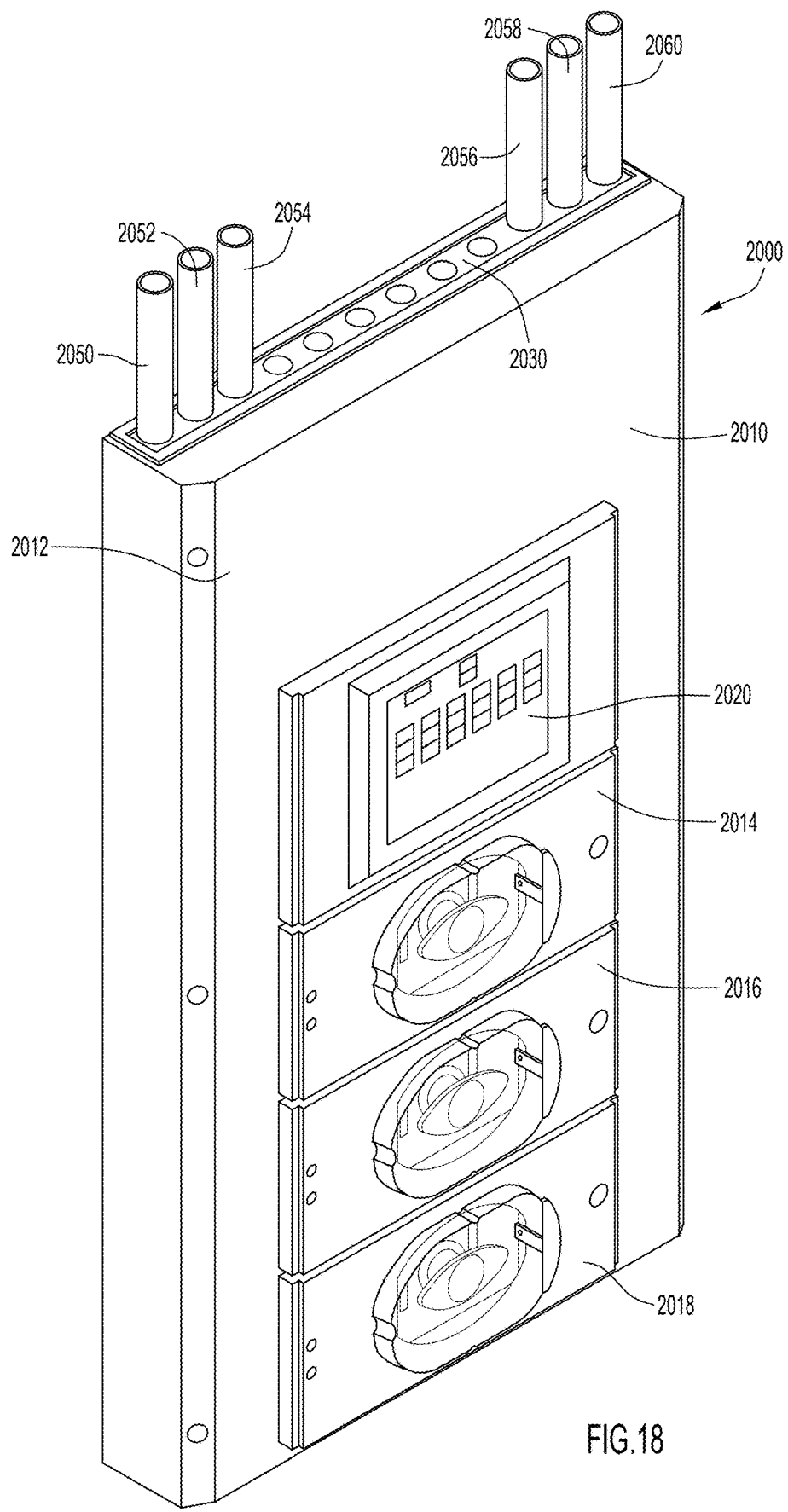
FIG. 18 illustrates a front perspective view of another embodiment of an AVSU according to the present invention.

Referring to FIG. 18, a front perspective view of another embodiment of an AVSU according to the present invention is illustrated. In this embodiment, the AVSU 2000 includes a cabinet 2010 with similar structures and features to the other embodiments of cabinets described herein except that the cabinet 2010 includes only three access panels 2014, 2016, and 2018 located on the front surface 2012 of the cabinet 2010. In addition to the access panels 2014, 2016, and 2018, the cabinet 2010 includes a control panel 2020 that can be used to display the status and operational information of the AVSU as well as other information.

As shown, the quantity of pipes extending upwardly from the top surface 2030 of cabinet 2010 is fewer than previously described cabinet 20 because the quantity of access panels and corresponding valves is fewer. In this embodiment, cabinet 2010 includes pipes 2050, 2052, 2054, 2056, 2058, and 2060, which are connected in pairs to the components associated with access panels 2014, 2016, and 2018. In additional embodiments of the invention, an AVSU may have a single valve and a single access panel.

Figure 19A:
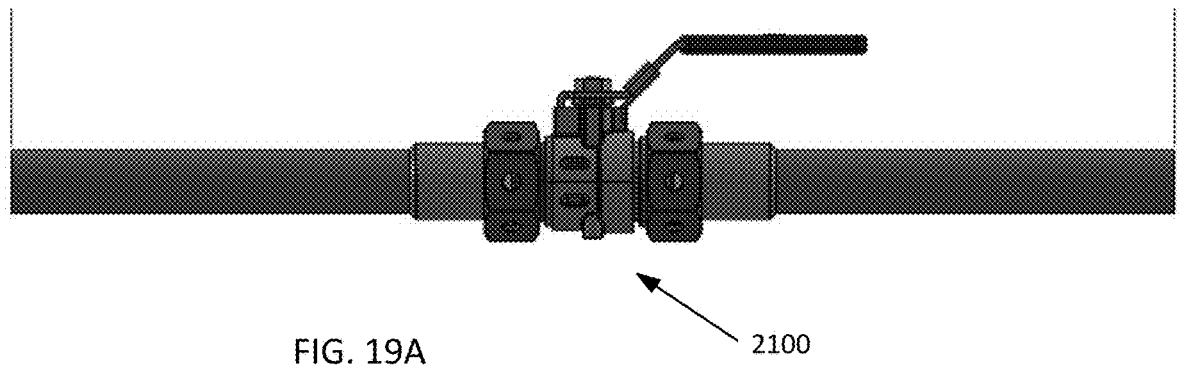
FIGS. 19A and 19B illustrate side views of embodiments of a valve for an AVSU according to the present invention.
Figure 19B:
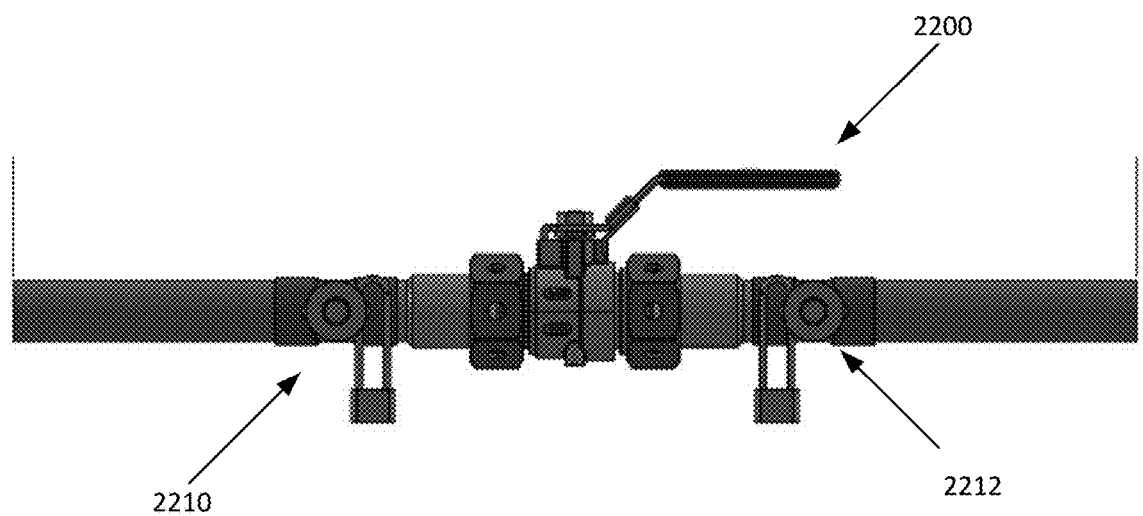

Referring to FIGS. 19A and 19B, side views of a lockable line valve 2100 and a lockable NIST line valve 2200 are shown, respectively. Each of the lockable line valve 2100 and a lockable NIST line valve 2200 can be used in a single valve AVSU or in a multiple valve AVSU. The lockable NIST line valve 2200 is shown with two auxiliary connections 2210 and 2212 proximate thereto.

In addition, various features from one of the embodiments may be incorporated into another of the embodiments. That is, it is believed that the disclosure set forth above encompasses multiple distinct inventions with independent utility. While each of these inventions has been disclosed in a preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Accordingly, it is appropriate that the appended claims be construed broadly and in a manner consistent with the scope of the disclosure as set forth in the following claims.

It is also to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention. In addition, it is further to be understood that the steps of the methods described herein may be performed in any order or in any suitable manner.

Finally, when used herein, the term "comprises" and its derivations (such as "comprising", etc.) should not be understood in an excluding sense, that is, these terms should not be interpreted as excluding the possibility that what is described and defined may include further elements, steps, etc. Similarly, where any description recites "a" or "a first" element or the equivalent thereof, such disclosure should be understood to include incorporation of one or more such elements, neither requiring nor excluding two or more such elements. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about", "around", "generally", and "substantially."

What is claimed is:

1. An area service valve unit for a gas and vacuum system, the area service valve unit comprising:
   a cabinet defining an interior volume, the cabinet including a first access panel coupled to the cabinet, the first access panel being movable between an opened position and a closed position relative to the cabinet, the first access panel having an opening formed therein;
   a first shutoff valve being in fluid communication with the gas and vacuum system, the first shutoff valve being located in the interior volume and behind the first access panel, the first shutoff valve having a first handwheel that can be manipulated to open and close the first shutoff valve, the first handwheel being aligned with the opening of the first access panel;
   a first access panel door mounted to the first access panel and covering the opening formed in the first access panel, the first access panel door being movable between a closed position and an opened position; and
   a first cover plate located between the first handwheel and the first shutoff valve, wherein the first cover plate is bendable to facilitate a user to access a component behind the first cover plate without removing the first handwheel or the first cover plate after the first access panel door is opened.

2. The area service valve unit of claim 1, wherein the first cover plate is made of a flexible material that enables bending of the first cover plate while the first cover plate remains mounted between the first handwheel and the first shutoff valve.

3. The area service valve unit of claim 1, wherein the first access panel door has an auxiliary opening formed therethrough, the auxiliary opening is aligned with an auxiliary connection of the gas and vacuum system, and the auxiliary connection is located behind the first access panel door.

4. The area service valve unit of claim 3, further comprising:
   an auxiliary plate mountable to the first access panel door, the auxiliary plate covering the auxiliary opening when the auxiliary plate is mounted to the first access panel door.

5. The area service valve unit of claim 1, wherein the first access panel includes a first aperture, the first access panel door includes a second aperture, and the first access panel door is secured in its closed position by a first securement member that engages the first aperture and the second aperture.

6. The area service valve unit of claim 5, wherein the first securement member is a tether that can be broken when a user pulls with sufficient force on the first access panel door relative to the first access panel.

7. The area service valve unit of claim 6, wherein the first access panel door can be opened by breaking the tether and can be subsequently removed from the first access panel, and the first access panel door can be secured to the first access panel with a second securement member.

8. The area service valve unit of claim 7, wherein the second securement member can be engaged with the first aperture and the second aperture when the first access panel door is remounted to the first access panel.

9. The area service valve unit of claim 1, further comprising:
   a first pipe in fluid communication with the first shutoff valve, the first pipe carrying a flow of fluid to the first shutoff valve; and
   a second pipe in fluid communication with the first shutoff valve, the second pipe carrying a flow of fluid away from the first shutoff valve, wherein each of the first pipe and the second pipe extends from the interior volume of the cabinet to the outside of the cabinet.

10. The area service valve unit of claim 9, wherein the cabinet includes a second access panel movably coupled to the cabinet, and the area service valve unit further comprises:
    a second shutoff valve being located behind the second access panel;
    a second access panel door movably mounted to the second access panel;
    a third pipe in fluid communication with the second shutoff valve, the third pipe carrying a flow of fluid to the second shutoff valve; and
    a fourth pipe in fluid communication with the second shutoff valve, the fourth pipe carrying a flow of fluid away from the second shutoff valve, wherein each of the third pipe and the fourth pipe extends from the interior volume of the cabinet to the outside of the cabinet.

11. The area service valve unit of claim 10, wherein the first access panel door is movable relative to the cabinet independent of any movement of the second access panel door, and the first access panel is movable relative to the cabinet independent of any movement of the second access panel.

12. The area service valve unit of claim 1, wherein the cabinet includes six access panels coupled thereto and the first access panel is one of the six access panels, the area service valve unit further comprises:
    six shutoff valves in fluid communication with the gas and vacuum system with the first shutoff valve being one of the six shutoff valves;
    six access panel doors coupled to the cabinet with the first access panel door being one of the six access panel doors;

six inlet pipes being coupled to the six shutoff valves, each of the six inlet pipes carrying a flow of fluid to one of the six shutoff valves, wherein three of the inlet pipes overlap with the other three of the inlet pipes in the interior volume of the cabinet; and six outlet pipes being coupled to the six shutoff valves, each of the six outlet pipes carrying a flow of fluid away from one of the six shutoff valves, wherein three of the outlet pipes overlap the other three of outlet pipes in the interior volume of the cabinet.

13. The area service valve unit of claim 12, wherein the six inlet pipes include a first inlet pipe, a second inlet pipe, a third inlet pipe, a fourth inlet pipe, a fifth inlet pipe, and a sixth inlet pipe, and the fourth inlet pipe overlaps the first inlet pipe, the fifth inlet pipe overlaps the second inlet pipe, and the six inlet pipe overlaps the third inlet pipe, and the area service valve unit further comprises:

a clamping mechanism coupled to the cabinet, the clamping mechanism securing the first inlet pipe, the second inlet pipe, the third inlet pipe, the fourth inlet pipe, the fifth inlet pipe, and the sixth inlet pipe in an overlapping arrangement.

14. The area service valve unit of claim 13, wherein the clamping mechanism includes an inner bracket portion coupled to the cabinet, at least one intermediate bracket portion located between pairs of the six inlet pipes, and an outer bracket portion coupled to the at least one intermediate bracket portion and to the inner bracket portion by at least one fastener.

15. An area service valve unit for a gas and vacuum system, the area service valve unit comprising:

a cabinet defining an interior volume, the cabinet including a plurality of access panels independently coupled to the cabinet, each of the plurality of access panels being movable between an opened position and a closed position relative to the cabinet, each of the plurality of the access panels having an opening formed therein;

a plurality of shutoff valves being in fluid communication with the gas and vacuum system, each of the plurality of shutoff valves being located in the interior volume of the cabinet and behind a respective one of the plurality of access panels, each of the plurality of shutoff valves having a handwheel that can be manipulated to open and close the particular shutoff valve;

a plurality of access panel doors, each of the plurality of access panel doors being mounted to one of the plurality of access panels and covering the respective opening in the particular access panel, each of the plurality of access panel doors being independently movable between a closed position and an opened position, each of the plurality of access panel doors being removable from its associated access panel and reattachable to its associated access panel via a securement member; and a plurality of cover plates, each of the plurality of cover plates being located between one of the plurality of shutoff valves and its associated handwheel, wherein each of the cover plates is flexible and can be bent to facilitate user access to a component behind the particular cover plate without removing the respective handwheel or cover plate.

16. The area service valve unit of claim 15, further comprising:

a plurality of inlet pipes extending from outside the cabinet to the interior volume of the cabinet, each of the plurality of inlet pipes being fluidically coupled to one of the plurality of shutoff valves; and a plurality of outlet pipes extending from the interior volume of the cabinet to outside the cabinet, each of the plurality of outlet pipes being fluidically coupled to one of the plurality of shutoff valves, wherein at least one of the plurality of inlet pipes overlaps with another one of the plurality of inlet pipes in the interior volume of the cabinet, and at least one of the plurality of outlet pipes overlaps with another one of the plurality of outlet pipes in the interior volume of the cabinet.

17. The area service valve unit of claim 16, further comprising:

a first clamping mechanism coupled to the cabinet, the first clamping mechanism securing overlapping inlet pipes in an overlapping configuration; and a second clamping mechanism coupled to the cabinet, the second clamping mechanism securing overlapping outlet pipes in an overlapping configuration.

18. An area service valve unit for a gas and vacuum system, the area service valve unit comprising:

a cabinet defining an interior volume, the cabinet including a plurality of access panels independently coupled to the cabinet, each of the plurality of access panels being movable between an opened position and a closed position relative to the cabinet, each of the plurality of the access panels having an opening formed therein;

a plurality of shutoff valves being in fluid communication with the gas and vacuum system, each of the plurality of shutoff valves being located in the interior volume of the cabinet and behind a respective one of the plurality of access panels, each of the plurality of shutoff valves having a handwheel that can be manipulated to open and close the particular shutoff valve; and a plurality of access panel doors, each of the plurality of access panel doors being:
coupled to one of the plurality of access panels and covering the respective opening in the particular access panel;
secured to its associated access panel by a first securement member;
rotatable relative to its associated access panel between a closed position and an opened position after a sufficient force is applied to the access panel door to break the first securement member;
removable from its associated access panel; and
reattachable to its associated access panel and secured thereto via a second securement member.

19. The area service valve unit of claim 18, wherein each of the access panels includes a slot proximate to its opening, and each of the plurality of access panel doors includes an extending member that can be engaged with the slot of the respective access panel to which the particular access panel door is coupled.

20. The area service valve unit of claim 19, wherein each of the access panel doors includes a first end proximate to which its extending member is located and an opposite second end to which its first securement member is coupled.

* * * * *